US012724970B2

(12) United States Patent
Lu et al.

(10) Patent No.: US 12,724,970 B2
(45) **Date of Patent: *Sep. 1, 2026**

(54) NAMED ENTITY RECOGNITION VISUAL CONTEXT AND CAPTION DATA

(71) Applicant: Snap Inc., Santa Monica, CA (US)

(72) Inventors: Di Lu, Troy, NY (US); Leonardo Ribas Machado Das Neves, Marina Del Rey, CA (US); Vitor Rocha De Carvalho, San Diego, CA (US); Ning Zhang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 18/761,154

(22) Filed: Jul. 1, 2024

(65) Prior Publication Data

US 2024/0354508 A1 Oct. 24, 2024

Related U.S. Application Data

(63) Continuation of application No. 18/201,075, filed on May 23, 2023, now Pat. No. 12,056,454, which is a continuation of application No. 17/306,010, filed on May 3, 2021, now Pat. No. 11,687,720, which is a (Continued)

(51) Int. Cl.

| | |
|---|---|
| ***G06F 40/295*** | (2020.01) |
| ***G06F 40/30*** | (2020.01) |
| ***G06N 3/08*** | (2023.01) |
| ***G06N 20/00*** | (2019.01) |

(52) U.S. Cl.

CPC ............ *G06F 40/295* (2020.01); *G06F 40/30* (2020.01); *G06N 3/08* (2013.01); *G06N 20/00* (2019.01)

(58) Field of Classification Search

None

See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,975,690 | A | 12/1990 | Torres |

(Continued)

FOREIGN PATENT DOCUMENTS

| | | | |
|---|---|---|---|
| CA | 2887596 | A1 | 7/2015 |
| EP | 2051480 | A1 | 4/2009 |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Nafiz E Hoque

(74) *Attorney, Agent, or Firm* — Schwegman Lundberg & Woessner, P.A.

(57) ABSTRACT

A caption of a multimodal message (e.g., social media post) can be identified as a named entity using an entity recognition system. The entity recognition system can use a visual attention based mechanism to generate a visual context representation from an image and caption. The system can use the visual context representation to identify one or more terms of the caption as a named entity.

20 Claims, 19 Drawing Sheets

Related U.S. Application Data continuation of application No. 16/230,341, filed on Dec. 21, 2018, now Pat. No. 11,017,173.

(60) Provisional application No. 62/610,051, filed on Dec. 22, 2017.

(56) References Cited

U.S. PATENT DOCUMENTS

| | | | |
|---|---|---|---|
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,158,044 | A | 12/2000 | Tibbetts |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,586 | B2 | 11/2002 | Ogilvie et al. |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,701,347 | B1 | 3/2004 | Ogilvie |
| 6,711,608 | B1 | 3/2004 | Ogilvie |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,243,163 | B1 | 7/2007 | Friend et al. |
| 7,269,426 | B2 | 9/2007 | Kokkonen et al. |
| 7,278,168 | B1 | 10/2007 | Chaudhury et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,376,715 | B2 | 5/2008 | Cunningham et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,478,402 | B2 | 1/2009 | Christensen et al. |
| 7,496,347 | B2 | 2/2009 | Puranik |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,703,140 | B2 | 4/2010 | Nath et al. |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 7,912,896 | B2 | 3/2011 | Wolovitz et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Loffe et al. |
| 8,099,109 | B2 | 1/2012 | Altman et al. |
| 8,112,716 | B2 | 2/2012 | Kobayashi |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,170,957 | B2 | 5/2012 | Richard |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,238,947 | B2 | 8/2012 | Lottin et al. |
| 8,244,593 | B2 | 8/2012 | Klinger et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |

(56) References Cited

U.S. PATENT DOCUMENTS

| | | | |
|---|---|---|---|
| 8,423,409 | B2 | 4/2013 | Rao |
| 8,471,914 | B2 | 6/2013 | Sakiyama et al. |
| 8,472,935 | B1 | 6/2013 | Fujisaki |
| 8,510,383 | B2 | 8/2013 | Hurley et al. |
| 8,527,345 | B2 | 9/2013 | Rothschild et al. |
| 8,554,627 | B2 | 10/2013 | Svendsen et al. |
| 8,560,612 | B2 | 10/2013 | Kilmer et al. |
| 8,570,907 | B2 | 10/2013 | Garcia, Jr. et al. |
| 8,594,680 | B2 | 11/2013 | Ledlie et al. |
| 8,613,089 | B1 | 12/2013 | Holloway et al. |
| 8,660,358 | B1 | 2/2014 | Bergboer et al. |
| 8,660,369 | B2 | 2/2014 | Llano et al. |
| 8,660,793 | B2 | 2/2014 | Ngo et al. |
| 8,682,350 | B2 | 3/2014 | Altman et al. |
| 8,718,333 | B2 | 5/2014 | Wolf et al. |
| 8,724,622 | B2 | 5/2014 | Rojas |
| 8,732,168 | B2 | 5/2014 | Johnson |
| 8,744,523 | B2 | 6/2014 | Fan et al. |
| 8,745,132 | B2 | 6/2014 | Obradovich |
| 8,761,800 | B2 | 6/2014 | Kuwahara |
| 8,768,876 | B2 | 7/2014 | Shim et al. |
| 8,775,972 | B2 | 7/2014 | Spiegel |
| 8,788,680 | B1 | 7/2014 | Naik |
| 8,790,187 | B2 | 7/2014 | Walker et al. |
| 8,797,415 | B2 | 8/2014 | Arnold |
| 8,798,646 | B1 | 8/2014 | Wang et al. |
| 8,856,349 | B2 | 10/2014 | Jain et al. |
| 8,874,677 | B2 | 10/2014 | Rosen et al. |
| 8,886,227 | B2 | 11/2014 | Schmidt et al. |
| 8,909,679 | B2 | 12/2014 | Root et al. |
| 8,909,714 | B2 | 12/2014 | Agarwal et al. |
| 8,909,725 | B1 | 12/2014 | Sehn |
| 8,914,752 | B1 | 12/2014 | Spiegel |
| 8,972,357 | B2 | 3/2015 | Shim et al. |
| 8,995,433 | B2 | 3/2015 | Rojas |
| 9,015,285 | B1 | 4/2015 | Ebsen et al. |
| 9,020,745 | B2 | 4/2015 | Johnston et al. |
| 9,040,574 | B2 | 5/2015 | Wang et al. |
| 9,055,416 | B2 | 6/2015 | Rosen et al. |
| 9,083,770 | B1 | 7/2015 | Drose et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,113,301 | B1 | 8/2015 | Spiegel et al. |
| 9,119,027 | B2 | 8/2015 | Sharon et al. |
| 9,123,074 | B2 | 9/2015 | Jacobs et al. |
| 9,143,382 | B2 | 9/2015 | Bhogal et al. |
| 9,143,681 | B1 | 9/2015 | Ebsen et al. |
| 9,148,424 | B1 | 9/2015 | Yang |
| 9,152,477 | B1 | 10/2015 | Campbell et al. |
| 9,191,776 | B2 | 11/2015 | Root et al. |
| 9,204,252 | B2 | 12/2015 | Root |
| 9,225,805 | B2 | 12/2015 | Kujawa et al. |
| 9,225,897 | B1 | 12/2015 | Sehn et al. |
| 9,237,202 | B1 | 1/2016 | Sehn |
| 9,258,459 | B2 | 2/2016 | Hartley |
| 9,264,463 | B2 | 2/2016 | Rubinstein et al. |
| 9,276,886 | B1 | 3/2016 | Samaranayake |
| 9,294,425 | B1 | 3/2016 | Son |
| 9,344,606 | B2 | 5/2016 | Hartley et al. |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,430,783 | B1 | 8/2016 | Sehn |
| 9,439,041 | B2 | 9/2016 | Parvizi et al. |
| 9,443,227 | B2 | 9/2016 | Evans et al. |
| 9,450,907 | B2 | 9/2016 | Pridmore et al. |
| 9,459,778 | B2 | 10/2016 | Hogeg et al. |
| 9,482,882 | B1 | 11/2016 | Hanover et al. |
| 9,482,883 | B1 | 11/2016 | Meisenholder |
| 9,489,661 | B2 | 11/2016 | Evans et al. |
| 9,491,134 | B2 | 11/2016 | Rosen et al. |
| 9,532,171 | B2 | 12/2016 | Allen et al. |
| 9,537,811 | B2 | 1/2017 | Allen et al. |
| 9,560,006 | B2 | 1/2017 | Prado et al. |
| 9,628,950 | B1 | 4/2017 | Noeth et al. |
| 9,652,896 | B1 | 5/2017 | Jurgenson et al. |
| 9,659,244 | B2 | 5/2017 | Anderton et al. |
| 9,693,191 | B2 | 6/2017 | Sehn |
| 9,705,831 | B2 | 7/2017 | Spiegel |
| 9,710,821 | B2 | 7/2017 | Heath |
| 9,742,713 | B2 | 8/2017 | Spiegel et al. |
| 9,785,796 | B1 | 10/2017 | Murphy et al. |
| 9,825,898 | B2 | 11/2017 | Sehn |
| 9,854,219 | B2 | 12/2017 | Sehn |
| 9,961,520 | B2 | 5/2018 | Brooks et al. |
| 10,805,647 | B2 * | 10/2020 | Zhang ..................... G06F 40/10 |
| 11,017,173 | B1 | 5/2021 | Lu et al. |
| 11,687,720 | B2 | 6/2023 | Lu et al. |
| 2002/0047868 | A1 | 4/2002 | Miyazawa |
| 2002/0078456 | A1 | 6/2002 | Hudson et al. |
| 2002/0087631 | A1 | 7/2002 | Sharma |
| 2002/0097257 | A1 | 7/2002 | Miller et al. |
| 2002/0122659 | A1 | 9/2002 | Mcgrath et al. |
| 2002/0128047 | A1 | 9/2002 | Gates |
| 2002/0144154 | A1 | 10/2002 | Tomkow |
| 2003/0001846 | A1 | 1/2003 | Davis et al. |
| 2003/0016247 | A1 | 1/2003 | Lai et al. |
| 2003/0017823 | A1 | 1/2003 | Mager et al. |
| 2003/0020623 | A1 | 1/2003 | Cao et al. |
| 2003/0023874 | A1 | 1/2003 | Prokupets et al. |
| 2003/0037124 | A1 | 2/2003 | Yamaura et al. |
| 2003/0052925 | A1 | 3/2003 | Daimon et al. |
| 2003/0101230 | A1 | 5/2003 | Benschoter et al. |
| 2003/0110503 | A1 | 6/2003 | Perkes |
| 2003/0126215 | A1 | 7/2003 | Udell |
| 2003/0148773 | A1 | 8/2003 | Spriestersbach et al. |
| 2003/0164856 | A1 | 9/2003 | Prager et al. |
| 2003/0217106 | A1 | 11/2003 | Adar et al. |
| 2003/0229607 | A1 | 12/2003 | Zellweger et al. |
| 2004/0027371 | A1 | 2/2004 | Jaeger |
| 2004/0064429 | A1 | 4/2004 | Hirstius et al. |
| 2004/0078367 | A1 | 4/2004 | Anderson et al. |
| 2004/0111467 | A1 | 6/2004 | Willis |
| 2004/0158739 | A1 | 8/2004 | Wakai et al. |
| 2004/0189465 | A1 | 9/2004 | Capobianco et al. |
| 2004/0203959 | A1 | 10/2004 | Coombes |
| 2004/0215625 | A1 | 10/2004 | Svendsen et al. |
| 2004/0243531 | A1 | 12/2004 | Dean |
| 2004/0243688 | A1 | 12/2004 | Wugofski |
| 2005/0021444 | A1 | 1/2005 | Bauer et al. |
| 2005/0022211 | A1 | 1/2005 | Veselov et al. |
| 2005/0048989 | A1 | 3/2005 | Jung |
| 2005/0078804 | A1 | 4/2005 | Yomoda |
| 2005/0097176 | A1 | 5/2005 | Schatz et al. |
| 2005/0102381 | A1 | 5/2005 | Jiang et al. |
| 2005/0104976 | A1 | 5/2005 | Currans |
| 2005/0114783 | A1 | 5/2005 | Szeto |
| 2005/0119936 | A1 | 6/2005 | Buchanan et al. |
| 2005/0122405 | A1 | 6/2005 | Voss et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson |
| 2005/0223066 | A1 | 10/2005 | Buchheit et al. |
| 2005/0288954 | A1 | 12/2005 | Mccarthy et al. |
| 2006/0026067 | A1 | 2/2006 | Nicholas et al. |
| 2006/0107297 | A1 | 5/2006 | Toyama et al. |
| 2006/0114338 | A1 | 6/2006 | Rothschild |
| 2006/0119882 | A1 | 6/2006 | Harris et al. |
| 2006/0242239 | A1 | 10/2006 | Morishima et al. |
| 2006/0251338 | A1 | 11/2006 | Gokturk et al. |
| 2006/0252438 | A1 | 11/2006 | Ansamaa et al. |
| 2006/0265417 | A1 | 11/2006 | Amato et al. |
| 2006/0270419 | A1 | 11/2006 | Crowley et al. |
| 2006/0287878 | A1 | 12/2006 | Wadhwa et al. |
| 2007/0004426 | A1 | 1/2007 | Pfleging et al. |
| 2007/0038715 | A1 | 2/2007 | Collins et al. |
| 2007/0040931 | A1 | 2/2007 | Nishizawa |
| 2007/0064899 | A1 | 3/2007 | Boss et al. |
| 2007/0073517 | A1 | 3/2007 | Panje |
| 2007/0073823 | A1 | 3/2007 | Cohen et al. |
| 2007/0075898 | A1 | 4/2007 | Markhovsky et al. |
| 2007/0082707 | A1 | 4/2007 | Flynt et al. |

(56) References Cited

U.S. PATENT DOCUMENTS

2007/0136228 A1 6/2007 Petersen
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0255456 A1 11/2007 Funayama
2007/0281690 A1 12/2007 Altman et al.
2008/0022329 A1 1/2008 Glad
2008/0025701 A1 1/2008 Ikeda
2008/0032703 A1 2/2008 Krumm et al.
2008/0033930 A1 2/2008 Warren
2008/0043041 A2 2/2008 Hedenstroem et al.
2008/0049704 A1 2/2008 Witteman et al.
2008/0055269 A1 3/2008 Lemay et al.
2008/0062141 A1 3/2008 Chandhri
2008/0076505 A1 3/2008 Ngyen et al.
2008/0092233 A1 4/2008 Tian et al.
2008/0094387 A1 4/2008 Chen
2008/0104503 A1 5/2008 Beall et al.
2008/0109844 A1 5/2008 Baldeschweiler et al.
2008/0120409 A1 5/2008 Sun et al.
2008/0147730 A1 6/2008 Lee et al.
2008/0148150 A1 6/2008 Mall
2008/0158230 A1 7/2008 Sharma et al.
2008/0168033 A1 7/2008 Ott et al.
2008/0168489 A1 7/2008 Schraga
2008/0189177 A1 8/2008 Anderton et al.
2008/0207176 A1 8/2008 Brackbill et al.
2008/0208692 A1 8/2008 Garaventi et al.
2008/0214210 A1 9/2008 Rasanen et al.
2008/0222545 A1 9/2008 Lemay
2008/0255976 A1 10/2008 Altberg et al.
2008/0256446 A1 10/2008 Yamamoto
2008/0256577 A1 10/2008 Funaki et al.
2008/0266421 A1 10/2008 Takahata et al.
2008/0270938 A1 10/2008 Carlson
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0318616 A1 12/2008 Chipalkatti et al.
2009/0006191 A1 1/2009 Arankalle et al.
2009/0006565 A1 1/2009 Velusamy et al.
2009/0015703 A1 1/2009 Kim et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0058822 A1 3/2009 Chaudhri
2009/0079846 A1 3/2009 Chou
2009/0089678 A1 4/2009 Sacco et al.
2009/0089710 A1 4/2009 Wood et al.
2009/0093261 A1 4/2009 Ziskind
2009/0132341 A1 5/2009 Klinger
2009/0132453 A1 5/2009 Hangartner et al.
2009/0132665 A1 5/2009 Thomsen et al.
2009/0148045 A1 6/2009 Lee et al.
2009/0153492 A1 6/2009 Popp
2009/0157450 A1 6/2009 Athsani et al.
2009/0157752 A1 6/2009 Gonzalez
2009/0160970 A1 6/2009 Fredlund et al.
2009/0163182 A1 6/2009 Gatti et al.
2009/0177299 A1 7/2009 Van De Sluis
2009/0192900 A1 7/2009 Collision
2009/0199242 A1 8/2009 Johnson et al.
2009/0215469 A1 8/2009 Fisher et al.
2009/0232354 A1 9/2009 Camp, Jr. et al.
2009/0234815 A1 9/2009 Boerries et al.
2009/0239552 A1 9/2009 Churchill et al.
2009/0249222 A1 10/2009 Schmidt et al.
2009/0249244 A1 10/2009 Robinson et al.
2009/0265647 A1 10/2009 Martin et al.
2009/0288022 A1 11/2009 Almstrand et al.
2009/0291672 A1 11/2009 Treves et al.
2009/0292608 A1 11/2009 Polachek
2009/0319607 A1 12/2009 Belz et al.
2009/0327073 A1 12/2009 Li
2010/0062794 A1 3/2010 Han
2010/0082427 A1 4/2010 Burgener et al.
2010/0082693 A1 4/2010 Hugg et al.
2010/0100568 A1 4/2010 Papin et al.
2010/0113065 A1 5/2010 Narayan et al.
2010/0130233 A1 5/2010 Parker
2010/0131880 A1 5/2010 Lee et al.
2010/0131895 A1 5/2010 Wohlert
2010/0153144 A1 6/2010 Miller et al.
2010/0159944 A1 6/2010 Pascal et al.
2010/0161658 A1 6/2010 Hamynen et al.
2010/0161831 A1 6/2010 Haas et al.
2010/0162149 A1 6/2010 Sheleheda et al.
2010/0183280 A1 7/2010 Beauregard et al.
2010/0185552 A1 7/2010 Deluca et al.
2010/0185665 A1 7/2010 Horn et al.
2010/0191631 A1 7/2010 Weidmann
2010/0197318 A1 8/2010 Petersen et al.
2010/0197319 A1 8/2010 Petersen et al.
2010/0198683 A1 8/2010 Aarabi
2010/0198694 A1 8/2010 Muthukrishnan
2010/0198826 A1 8/2010 Petersen et al.
2010/0198828 A1 8/2010 Petersen et al.
2010/0198862 A1 8/2010 Jennings et al.
2010/0198870 A1 8/2010 Petersen et al.
2010/0198917 A1 8/2010 Petersen et al.
2010/0201482 A1 8/2010 Robertson et al.
2010/0201536 A1 8/2010 Robertson et al.
2010/0214436 A1 8/2010 Kim et al.
2010/0223128 A1 9/2010 Dukellis et al.
2010/0223343 A1 9/2010 Bosan et al.
2010/0250109 A1 9/2010 Johnston et al.
2010/0257196 A1 10/2010 Waters et al.
2010/0259386 A1 10/2010 Holley et al.
2010/0273509 A1 10/2010 Sweeney et al.
2010/0281045 A1 11/2010 Dean
2010/0306669 A1 12/2010 Della Pasqua
2011/0004071 A1 1/2011 Faiola et al.
2011/0010205 A1 1/2011 Richards
2011/0029512 A1 2/2011 Folgner et al.
2011/0040783 A1 2/2011 Uemichi et al.
2011/0040804 A1 2/2011 Peirce et al.
2011/0050909 A1 3/2011 Ellenby et al.
2011/0050915 A1 3/2011 Wang et al.
2011/0064388 A1 3/2011 Brown et al.
2011/0066743 A1 3/2011 Hurley et al.
2011/0083101 A1 4/2011 Sharon et al.
2011/0099507 A1 4/2011 Nesladek et al.
2011/0102630 A1 5/2011 Rukes
2011/0119133 A1 5/2011 Igelman et al.
2011/0137881 A1 6/2011 Cheng et al.
2011/0145564 A1 6/2011 Moshir et al.
2011/0159890 A1 6/2011 Fortescue et al.
2011/0164163 A1 7/2011 Bilbrey et al.
2011/0197194 A1 8/2011 D'Angelo et al.
2011/0202598 A1 8/2011 Evans et al.
2011/0202968 A1 8/2011 Nurmi
2011/0211534 A1 9/2011 Schmidt et al.
2011/0213845 A1 9/2011 Logan et al.
2011/0215966 A1 9/2011 Kim et al.
2011/0225048 A1 9/2011 Nair
2011/0238763 A1 9/2011 Shin et al.
2011/0255736 A1 10/2011 Thompson et al.
2011/0273575 A1 11/2011 Lee
2011/0282799 A1 11/2011 Huston
2011/0283188 A1 11/2011 Farrenkopf
2011/0286586 A1 11/2011 Saylor et al.
2011/0314419 A1 12/2011 Dunn et al.

(56) References Cited

U.S. PATENT DOCUMENTS

2011/0320373 A1 12/2011 Lee et al.
2012/0028659 A1 2/2012 Whitney et al.
2012/0033718 A1 2/2012 Kauffman et al.
2012/0036015 A1 2/2012 Sheikh
2012/0036443 A1 2/2012 Ohmori et al.
2012/0054797 A1 3/2012 Skog et al.
2012/0059722 A1 3/2012 Rao
2012/0062805 A1 3/2012 Candelore
2012/0084731 A1 4/2012 Filman et al.
2012/0084835 A1 4/2012 Thomas et al.
2012/0099800 A1 4/2012 Llano et al.
2012/0108293 A1 5/2012 Law et al.
2012/0110096 A1 5/2012 Smarr et al.
2012/0113143 A1 5/2012 Adhikari et al.
2012/0113272 A1 5/2012 Hata
2012/0123830 A1 5/2012 Svendsen et al.
2012/0123871 A1 5/2012 Svendsen et al.
2012/0123875 A1 5/2012 Svendsen et al.
2012/0124126 A1 5/2012 Alcazar et al.
2012/0124176 A1 5/2012 Curtis et al.
2012/0124458 A1 5/2012 Cruzada
2012/0131507 A1 5/2012 Sparandara et al.
2012/0131512 A1 5/2012 Takeuchi et al.
2012/0143760 A1 6/2012 Abulafia et al.
2012/0150978 A1 6/2012 Monaco
2012/0165100 A1 6/2012 Lalancette et al.
2012/0166971 A1 6/2012 Sachson et al.
2012/0169855 A1 7/2012 Oh
2012/0172062 A1 7/2012 Altman et al.
2012/0173991 A1 7/2012 Roberts et al.
2012/0176401 A1 7/2012 Hayward et al.
2012/0184248 A1 7/2012 Speede
2012/0197724 A1 8/2012 Kendall
2012/0200743 A1 8/2012 Blanchflower et al.
2012/0209921 A1 8/2012 Adafin et al.
2012/0209924 A1 8/2012 Evans et al.
2012/0210244 A1 8/2012 De et al.
2012/0212632 A1 8/2012 Mate et al.
2012/0220264 A1 8/2012 Kawabata
2012/0226748 A1 9/2012 Bosworth et al.
2012/0233000 A1 9/2012 Fisher et al.
2012/0236162 A1 9/2012 Imamura
2012/0239761 A1 9/2012 Linner et al.
2012/0250951 A1 10/2012 Chen
2012/0252418 A1 10/2012 Kandekar et al.
2012/0254325 A1 10/2012 Majeti et al.
2012/0278387 A1 11/2012 Garcia et al.
2012/0278692 A1 11/2012 Shi
2012/0290637 A1 11/2012 Perantatos et al.
2012/0299954 A1 11/2012 Wada et al.
2012/0304052 A1 11/2012 Tanaka et al.
2012/0304080 A1 11/2012 Wormald et al.
2012/0307096 A1 12/2012 Ford et al.
2012/0307112 A1 12/2012 Kunishige et al.
2012/0319904 A1 12/2012 Lee et al.
2012/0323933 A1 12/2012 He et al.
2012/0324018 A1 12/2012 Metcalf et al.
2013/0006759 A1 1/2013 Srivastava et al.
2013/0024757 A1 1/2013 Doll et al.
2013/0036364 A1 2/2013 Johnson
2013/0045753 A1 2/2013 Obermeyer et al.
2013/0050260 A1 2/2013 Reitan
2013/0055083 A1 2/2013 Fino
2013/0057587 A1 3/2013 Leonard et al.
2013/0059607 A1 3/2013 Herz et al.
2013/0060690 A1 3/2013 Oskolkov et al.
2013/0063369 A1 3/2013 Malhotra et al.
2013/0067027 A1 3/2013 Song et al.
2013/0071093 A1 3/2013 Hanks et al.
2013/0080254 A1 3/2013 Thramann
2013/0085790 A1 4/2013 Palmer et al.
2013/0086072 A1 4/2013 Peng et al.
2013/0090171 A1 4/2013 Holton et al.
2013/0095857 A1 4/2013 Garcia et al.
2013/0104053 A1 4/2013 Thornton et al.
2013/0110885 A1 5/2013 Brundrett, III
2013/0111514 A1 5/2013 Slavin et al.
2013/0128059 A1 5/2013 Kristensson
2013/0129252 A1 5/2013 Lauper
2013/0132477 A1 5/2013 Bosworth et al.
2013/0145286 A1 6/2013 Feng et al.
2013/0159110 A1 6/2013 Rajaram et al.
2013/0159919 A1 6/2013 Leydon
2013/0169822 A1 7/2013 Zhu et al.
2013/0173729 A1 7/2013 Starenky et al.
2013/0182133 A1 7/2013 Tanabe
2013/0185131 A1 7/2013 Sinha et al.
2013/0191198 A1 7/2013 Carlson et al.
2013/0194301 A1 8/2013 Robbins et al.
2013/0198176 A1 8/2013 Kim
2013/0218858 A1* 8/2013 Perelman ............ G06F 16/9535
707/706
2013/0218965 A1 8/2013 Abrol et al.
2013/0218968 A1 8/2013 Mcevilly et al.
2013/0222323 A1 8/2013 Mckenzie
2013/0227476 A1 8/2013 Frey
2013/0232194 A1 9/2013 Knapp et al.
2013/0263031 A1 10/2013 Oshiro et al.
2013/0265450 A1 10/2013 Barnes, Jr.
2013/0267253 A1 10/2013 Case et al.
2013/0275505 A1 10/2013 Gauglitz et al.
2013/0290443 A1 10/2013 Collins et al.
2013/0304646 A1 11/2013 De Geer
2013/0311255 A1 11/2013 Cummins et al.
2013/0325964 A1 12/2013 Berberat
2013/0344896 A1 12/2013 Kirmse et al.
2013/0346869 A1 12/2013 Asver et al.
2013/0346877 A1 12/2013 Borovoy et al.
2014/0006129 A1 1/2014 Heath
2014/0011538 A1 1/2014 Mulcahy et al.
2014/0019264 A1 1/2014 Wachman et al.
2014/0032682 A1 1/2014 Prado et al.
2014/0037154 A1 2/2014 Zhang et al.
2014/0043204 A1 2/2014 Basnayake et al.
2014/0045530 A1 2/2014 Gordon et al.
2014/0047016 A1 2/2014 Rao
2014/0047045 A1 2/2014 Baldwin et al.
2014/0047335 A1 2/2014 Lewis et al.
2014/0049652 A1 2/2014 Moon et al.
2014/0052485 A1 2/2014 Shidfar
2014/0052633 A1 2/2014 Gandhi
2014/0057660 A1 2/2014 Wager
2014/0082651 A1 3/2014 Sharifi
2014/0092130 A1 4/2014 Anderson et al.
2014/0096029 A1 4/2014 Schultz
2014/0114565 A1 4/2014 Aziz et al.
2014/0122658 A1 5/2014 Haeger et al.
2014/0122787 A1 5/2014 Shalvi et al.
2014/0129953 A1 5/2014 Spiegel
2014/0143143 A1 5/2014 Fasoli et al.
2014/0149519 A1 5/2014 Redfern et al.
2014/0155102 A1 6/2014 Cooper et al.
2014/0173424 A1 6/2014 Hogeg et al.
2014/0173457 A1 6/2014 Wang et al.
2014/0189592 A1 7/2014 Benchenaa et al.
2014/0201527 A1 7/2014 Krivorot
2014/0207679 A1 7/2014 Cho
2014/0214471 A1 7/2014 Schreiner, III
2014/0222564 A1 8/2014 Kranendonk et al.
2014/0258405 A1 9/2014 Perkin
2014/0265359 A1 9/2014 Cheng et al.
2014/0266703 A1 9/2014 Dalley, Jr. et al.
2014/0279061 A1 9/2014 Elimeliah et al.
2014/0279436 A1 9/2014 Dorsey et al.
2014/0279540 A1 9/2014 Jackson
2014/0280537 A1 9/2014 Pridmore et al.
2014/0282096 A1 9/2014 Rubinstein et al.
2014/0287779 A1 9/2014 O'Keefe et al.
2014/0289833 A1 9/2014 Briceno
2014/0306986 A1 10/2014 Gottesman et al.
2014/0317302 A1 10/2014 Naik
2014/0324627 A1 10/2014 Haver et al.
2014/0324629 A1 10/2014 Jacobs
2014/0325383 A1 10/2014 Brown et al.

(56) References Cited

U.S. PATENT DOCUMENTS

2014/0359024 A1 12/2014 Spiegel
2014/0359032 A1 12/2014 Spiegel et al.
2015/0020086 A1 1/2015 Chen et al.
2015/0046278 A1 2/2015 Pei et al.
2015/0071619 A1 3/2015 Brough
2015/0087263 A1 3/2015 Branscomb et al.
2015/0088622 A1 3/2015 Ganschow et al.
2015/0095020 A1 4/2015 Leydon
2015/0096042 A1 4/2015 Mizrachi
2015/0116529 A1 4/2015 Wu et al.
2015/0169827 A1 6/2015 Laborde
2015/0172534 A1 6/2015 Miyakawa et al.
2015/0178260 A1 6/2015 Brunson
2015/0199082 A1 7/2015 Scholler et al.
2015/0222814 A1 8/2015 Li et al.
2015/0227602 A1 8/2015 Ramu et al.
2015/0261917 A1 9/2015 Smith
2015/0312184 A1 10/2015 Langholz et al.
2015/0350136 A1 12/2015 Flynn, III et al.
2015/0365795 A1 12/2015 Allen et al.
2015/0378502 A1 12/2015 Hu et al.
2016/0006927 A1 1/2016 Sehn
2016/0014063 A1 1/2016 Hogeg et al.
2016/0085773 A1 3/2016 Chang et al.
2016/0085863 A1 3/2016 Allen et al.
2016/0086670 A1 3/2016 Gross et al.
2016/0099901 A1 4/2016 Allen et al.
2016/0180887 A1 6/2016 Sehn
2016/0182422 A1 6/2016 Sehn et al.
2016/0182875 A1 6/2016 Sehn
2016/0239248 A1 8/2016 Sehn
2016/0277419 A1 9/2016 Allen et al.
2016/0321708 A1 11/2016 Sehn
2016/0359957 A1 12/2016 Laliberte
2016/0359987 A1 12/2016 Laliberte
2017/0006094 A1 1/2017 Abou Mahmoud et al.
2017/0061308 A1 3/2017 Chen et al.
2017/0132821 A1* 5/2017 Valliani .................. G06F 18/24
2017/0161382 A1 6/2017 Ouimet et al.
2017/0263029 A1 9/2017 Yan et al.
2017/0287006 A1 10/2017 Azmoodeh et al.
2017/0295250 A1 10/2017 Samaranayake et al.
2017/0374003 A1 12/2017 Allen et al.
2017/0374508 A1 12/2017 Davis et al.
2018/0181592 A1* 6/2018 Chen .................. G06F 16/5846
2019/0087677 A1 3/2019 Wolf et al.
2021/0256213 A1 8/2021 Lu et al.
2023/0385551 A1 11/2023 Lu et al.

FOREIGN PATENT DOCUMENTS

EP 2151797 A1 2/2010
GB 2399928 A 9/2004
KR 19990073076 A 10/1999
KR 20010078417 A 8/2001
WO WO-1996024213 A1 8/1996
WO WO-1999063453 A1 12/1999
WO WO-2000058882 A1 10/2000
WO WO-2001029642 A1 4/2001
WO WO-2001050703 A3 7/2001
WO WO-2006118755 A2 11/2006
WO WO-2007092668 A2 8/2007
WO WO-2009043020 A2 4/2009
WO WO-2011040821 A1 4/2011
WO WO-2011119407 A1 9/2011
WO WO-2012000107 A1 1/2012
WO WO-2013008238 A1 1/2013
WO WO-2013008251 A2 1/2013
WO WO-2013045753 A1 4/2013
WO WO-2014006129 A1 1/2014
WO WO-2014068573 A1 5/2014
WO WO-2014115136 A1 7/2014
WO WO-2014194262 A2 12/2014
WO WO-2015192026 A1 12/2015
WO WO-2016044424 A1 3/2016
WO WO-2016054562 A1 4/2016
WO WO-2016065131 A1 4/2016
WO WO-2016100318 A2 6/2016
WO WO-2016100318 A3 6/2016
WO WO-2016100342 A1 6/2016
WO WO-2016/112299 A1 7/2016
WO WO-2016149594 A1 9/2016
WO WO-2016179166 A1 11/2016
WO WO-2016179235 A1 11/2016
WO WO-2017176739 A1 10/2017
WO WO-2017176992 A1 10/2017
WO WO-2018005644 A1 1/2018

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.
"U.S. Appl. No. 16/230,341, Non Final Office Action mailed Oct. 2, 2020", 5 pgs.
"U.S. Appl. No. 16/230,341, Notice of Allowance mailed Jan. 26, 2021", 6 pgs.
"U.S. Appl. No. 16/230,341, Response filed Jan. 4, 2021 to Non Final Office Action mailed Oct. 2, 2020", 8 pgs.
"U.S. Appl. No. 17/306,010, Corrected Notice of Allowability mailed Feb. 24, 2023", 2 pgs.
"U.S. Appl. No. 17/306,010, Non Final Office Action mailed Oct. 3, 2022", 9 pgs.
"U.S. Appl. No. 17/306,010, Notice of Allowance mailed Feb. 14, 2023", 5 pgs.
"U.S. Appl. No. 17/306,010, Preliminary Amendment filed May 5, 2021", 6 pgs.
"U.S. Appl. No. 18/201,075, Non Final Office Action mailed Dec. 7, 2023", 9 pgs.
"U.S. Appl. No. 18/201,075, Notice of Allowance mailed Apr. 2, 2024", 5 pgs.
"U.S. Appl. No. 18/201,075, Response filed Mar. 6, 2024 to Non Final Office Action mailed Dec. 7, 2023", 9 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"InstaPlace Photo App Tell the Whole Story", [Online] Retrieved from the Internet: <URL: youtu.be/uF_gFkg1hBM>, (Nov. 8, 2013), 113 pgs. , 1:02 min.
"International Application Serial No. PCT/US2015/037251, International Search Report mailed Sep. 29, 2015", 2 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

(56) References Cited

OTHER PUBLICATIONS

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the Internet: < URL: http://www.theregister.co.uk/2005/12/12/stealthtext/>, (Dec. 12, 2005), 1 pg.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term =. bkQ9qVZWe#.nv58YXpkV>, (Dec. 22, 2013), 13 pgs.
Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Sawers, Paul, "Snapchat for iOS Lets you Send Photos to Friends and set How long They're Visible for", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.
Shein, Esther, "Ephemeral Data", Communications of the ACM, vol. 56, No. 9, (Sep. 2013), 3 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
Vaas, Lisa, "StealthText, Should You Choose to Accept It", [Online] Retrieved from the Internet: <URL: https://www.eweek.com/enterprise-apps/stealthtext-should-you-choose-to- accept-it/>, (Dec. 13, 2005), 3 pgs.

* cited by examiner

NAMED ENTITY RECOGNITION VISUAL CONTEXT AND CAPTION DATA

CLAIM FOR PRIORITY

This application is a continuation of U.S. patent application Ser. No. 18/201,075, filed on May 23, 2023, which is a continuation of U.S. patent application Ser. No. 17/306,010, filed on May 3, 2021, which is a continuation of U.S. patent application Ser. No. 16/230,341, filed on Dec. 21, 2018, which claims the benefit of priority to U.S. Provisional Application Ser. No. 62/610,051, filed on Dec. 22, 2017, each of which is hereby incorporated by reference in its entirety.

TECHNICAL FIELD

Embodiments of the present disclosure relate generally to machine learning and, more particularly, but not by way of limitation, to identifying named entities using machine learning.

BACKGROUND

Named Entity Recognition (NER) is a computational task in which one or more words of text are determined to be a named entity (e.g., a noun, celebrity, city, organization). For example, an NER scheme may assume a pop song exists called “Modern Baseball”. Given a sentence “I love modern baseball!” as an input, a NER model attempts to determine whether one or more terms of the sentence are a named entity, e.g., whether the sentence is expression of love for the sport baseball in modern times or a pop song with a title of “Modern Baseball”. Typically, an NER scheme needs a large well-structured dataset from which it can train a model, which can then be applied to recognize one or more words as a named entity. However, recognizing a named entity from a few words, some of which may be intentionally misspelled (e.g., “I luv new yoooooork ctiy!”) is difficult for current NER schemes.

BRIEF DESCRIPTION OF THE DRAWINGS

To easily identify the discussion of any particular element or act, the most significant digit or digits in a reference number refer to the figure (“FIG.”) number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

In general, well-known instruction instances, protocols, structures, and techniques are not necessarily shown in detail.

As discussed, named entity recognition is a difficult computational task. Further, performing NER using social media posts is made more difficult due to the shortness of the captions, intentional misspelling of words, acronyms, and emojis being used in a certain way based on societal trends. To this end, a visual named entity system can be implemented to identify named entities in multimodal captions using a visual attention network and vector information from words and characters in a caption. In some example embodiments, an image of a multimodal message is processed via an attention network to indicate which portions of the region are more relevant to a caption that accompanies the image. The attention network can generate a visual context vector from the image and the caption which can be integrated into a recurrent neural network (e.g., a bidirectional long short term memory (LSTM) having conditional random field layer), which can indicate which terms in the caption correspond to a named entity. The identified named entity can be used to select and incorporate content for inclusion in a social media post. For example, the visual named entity system can determine that a certain band is being discussed in a caption and suggest a guitar emoji for inclusion or overlay in a social media post.

Figure 1:
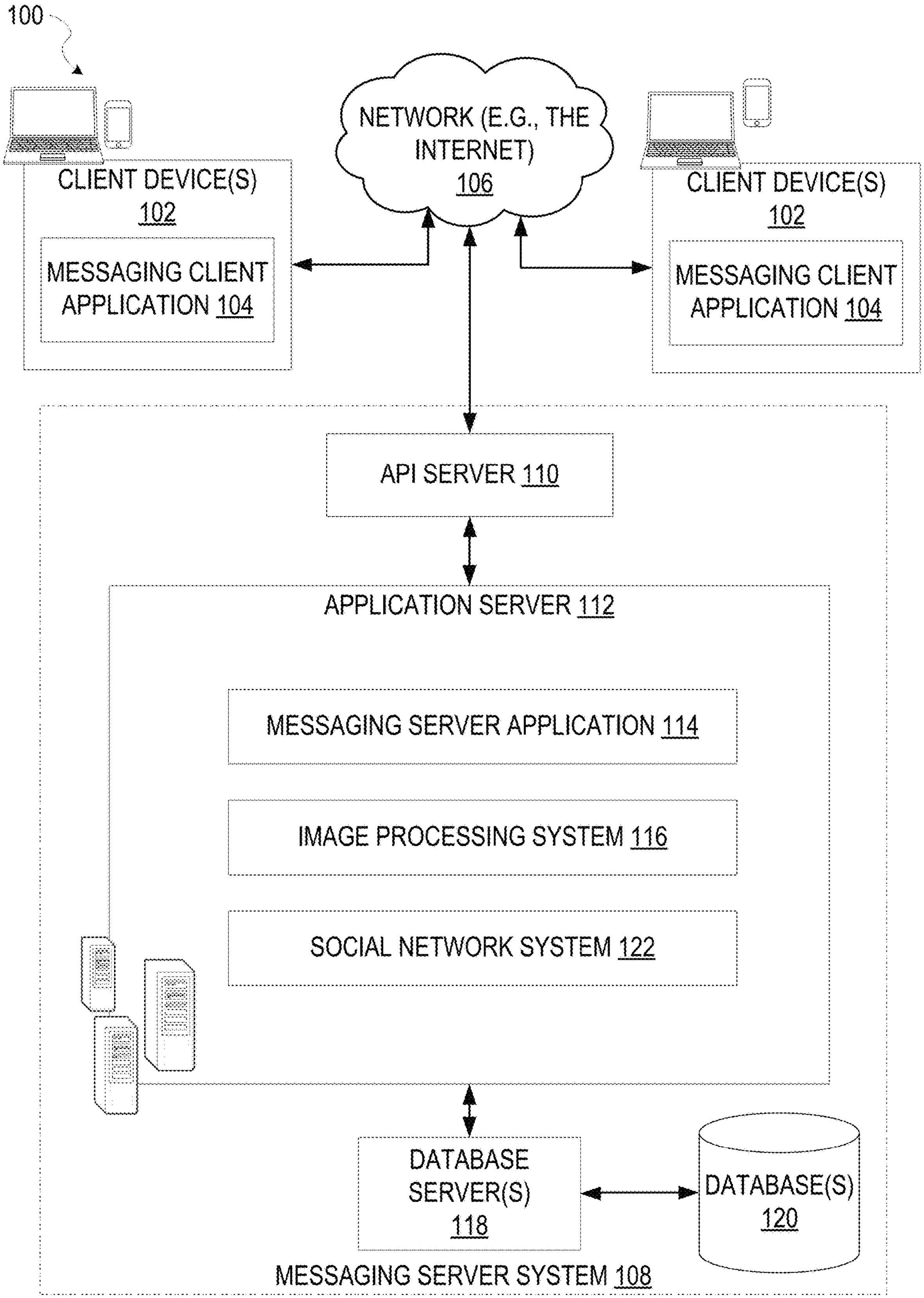
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
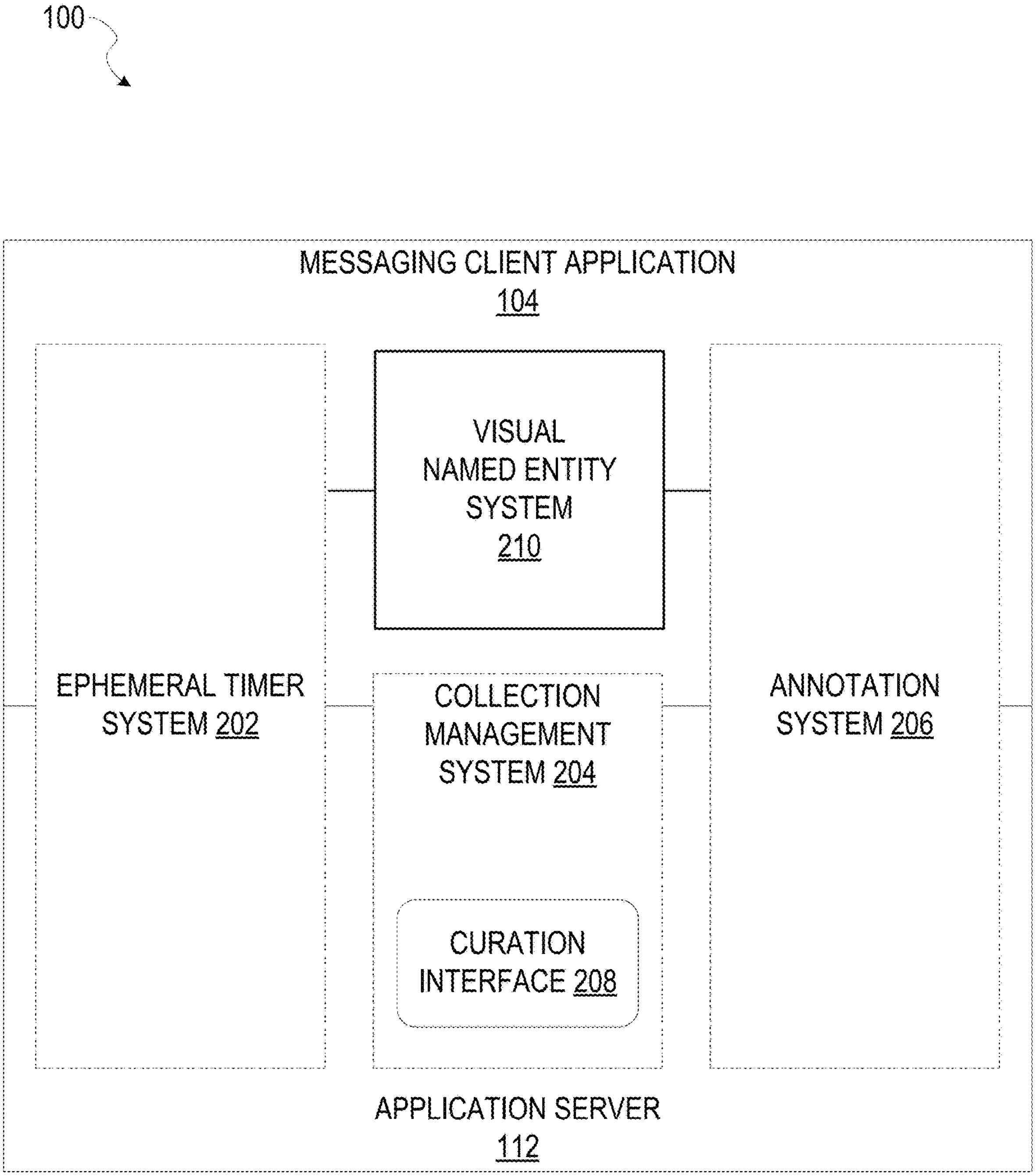
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., an Ephemeral Message Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The visual named entity recognition system 210 comprises one or more neural networks configured to identify an entity referenced by a multimodal message, as discussed in further detail below. In some example embodiments, the visual named entity recognition system 210 is integrated and run from the application server 112.

Figure 3:
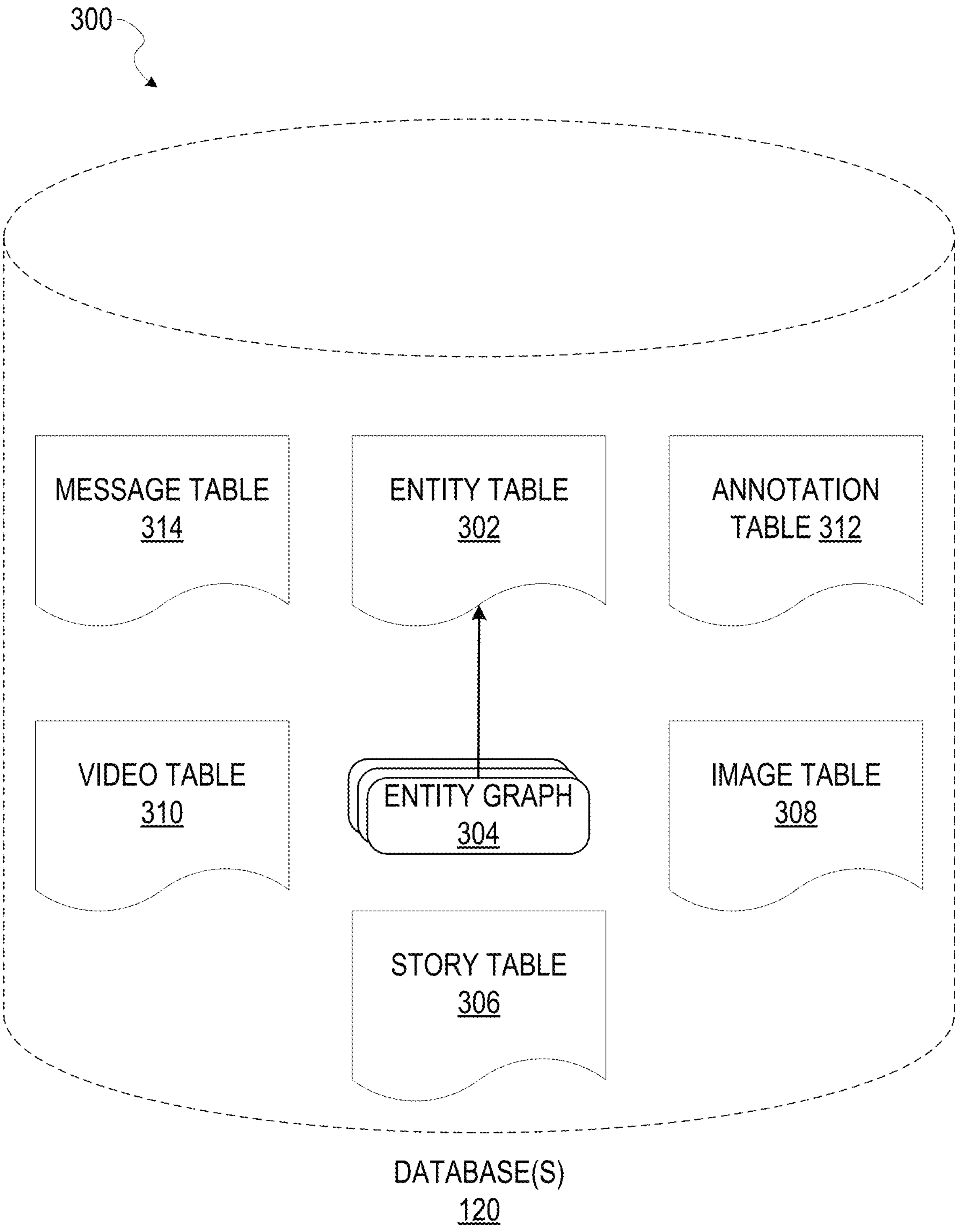
FIG. 3 is a schematic diagram illustrating data that may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
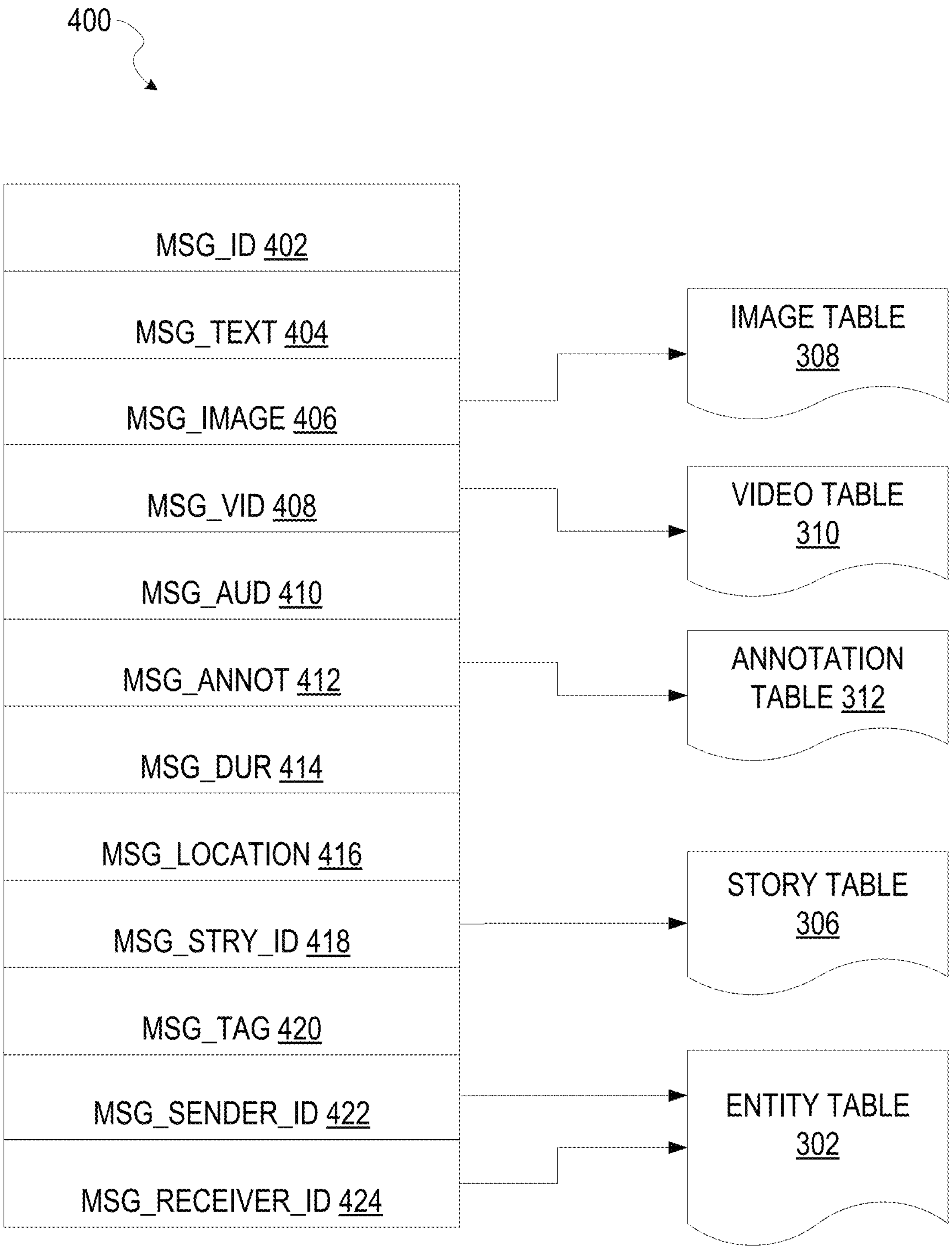
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102, and that is included in the message 400.
- A message image payload 406: image data captured by a camera component of a client device 102 or retrieved from memory of a client device 102, and that is included in the message 400.
- A message video payload 408: video data captured by a camera component or retrieved from a memory component of the client device 102, and that is included in the message 400.
- A message audio payload 410: audio data captured by a microphone or retrieved from the memory component of the client device 102, and that is included in the message 400.
- Message annotations 412: annotation data (e.g., filters, stickers, or other enhancements) that represents annotations to be applied to the message image payload 406, message video payload 408, or message audio payload 410 of the message 400.
- A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).
- A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.
- A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
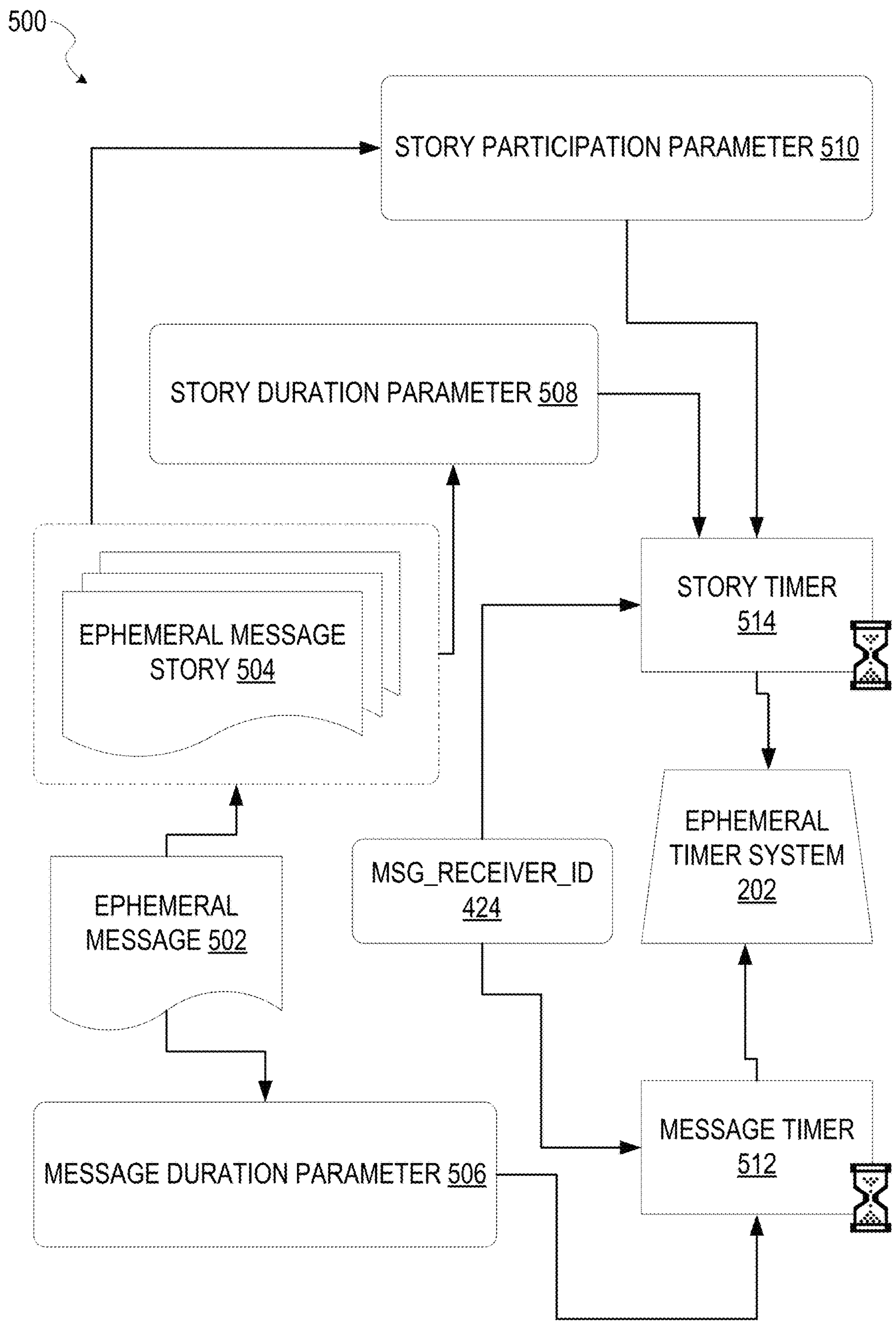
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
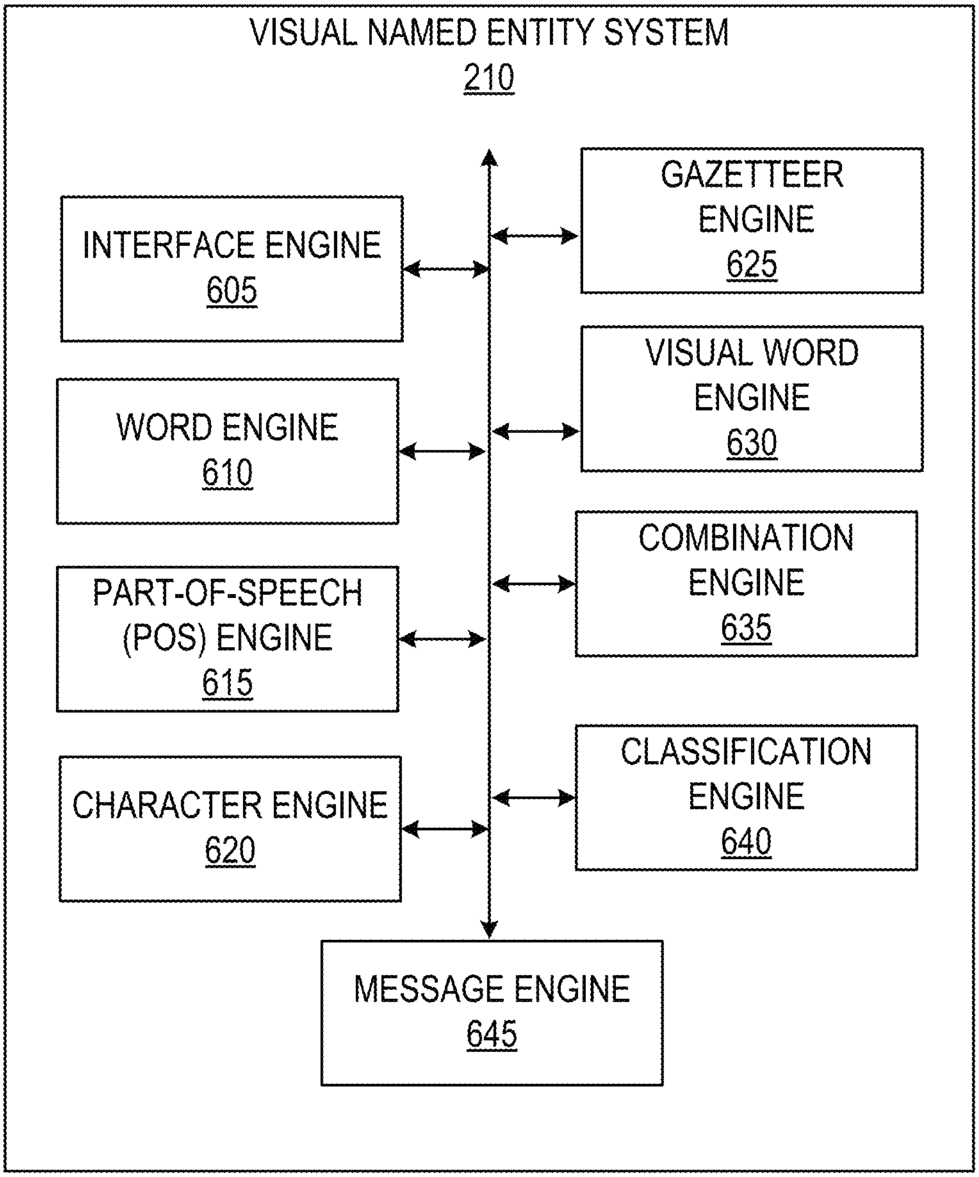
FIG. 6 shows internal functional components of a visual gazetteer named entity system, according to some example embodiments.

FIG. 6 shows internal functional components of a visual named entity system 210, according to some example embodiments. As illustrated, the visual named entity recognition system 210 comprises an interface engine 605, a word engine 610, a part-of-speech engine 615, a character engine 620, a gazetteer engine 625, a visual word engine 630, a combination engine 635, a classification engine 640, and a message engine 645. The interface engine 605 manages identification or otherwise generation of one or more images using an image capture device (e.g. a camera) of the client device. The interface engine 605 may also identify or generate a multimodal message that has one or more images (e.g. an image, a video sequence), audio data captured simultaneously with the one or more images by the client device, and a caption input by the user of the client device. The word engine 610 is a neural network configured to generate word embeddings, according to some example embodiments. The part-of-speech engine 615 is configured to receive one or more words (e.g. a sentence) and label each of the words using a part of speech tag. For example, the part-of-speech engine 615 may label one word as a noun, another word is a preposition, and yet another word as a verb, and so on. The character engine 620 is a neural network configured to generate character embeddings from one or more words (e.g. words in the caption of the multimodal message identified or otherwise generated by the interface engine 605). The gazetteer engine 625 is configured to generate gazetteer vectors for each of the words in the caption of the multimodal message. A gazetteer is a list of words of a particular type, such as a list of celebrities, a list of places, a list of organizations, a list of sports teams, and so on. In some example embodiments, one or more words of the caption in the multimodal message are identified as corresponding to a gazetteer vector and the message is tagged with the gazetteer tag. Each gazetteer tag has a corresponding gazetteer vector in a gazetteer tag lookup table. In some example embodiments, the gazetteer tag lookup table comprises eight vectors which corresponds to eight gazetteer's. In some example embodiments, each word can be used to generate up to eight gazetteer vectors from the lookup table. For the given word, each of the vectors can be concatenated to represent that word's final gazetteer feature vector.

The visual word engine 630 is configured to generate a word vector from an image and caption of the multimodal message. In particular, and as explained in further detail below, the image can be processed using a convolution on neural network and the caption can be processed using a bidirectional recurrent neural network. The bidirectional recurrent neural network can generate a vector that can be used to call attention to or otherwise emphasize certain regions of the image that more strongly correspond to nouns and verbs in the caption. The combination engine 635 is configured to generate a combined vector that, for a given word in the caption, concatenates the part-of-speech representation for that word, the word embedding for that word, the gazetteer representation for that word, a forward time LSTM character embedding, and backward time LSTM character embedding.

The classification engine 640 is configured to receive the combined vector generated by the combination engine 635 and the visual word vector generated by the visual word engine 630, and recursively generate an indication whether the words in the caption correspond to a named entity. The message engine 645 is configured to select overlay content that has been pre-associated with an identified named entity in the caption, and overlay the overlay content on the multimodal message. The message engine 645 can also manage publishing the multimodal message with the overlay content as an ephemeral message on a social network site.

Figure 7A:
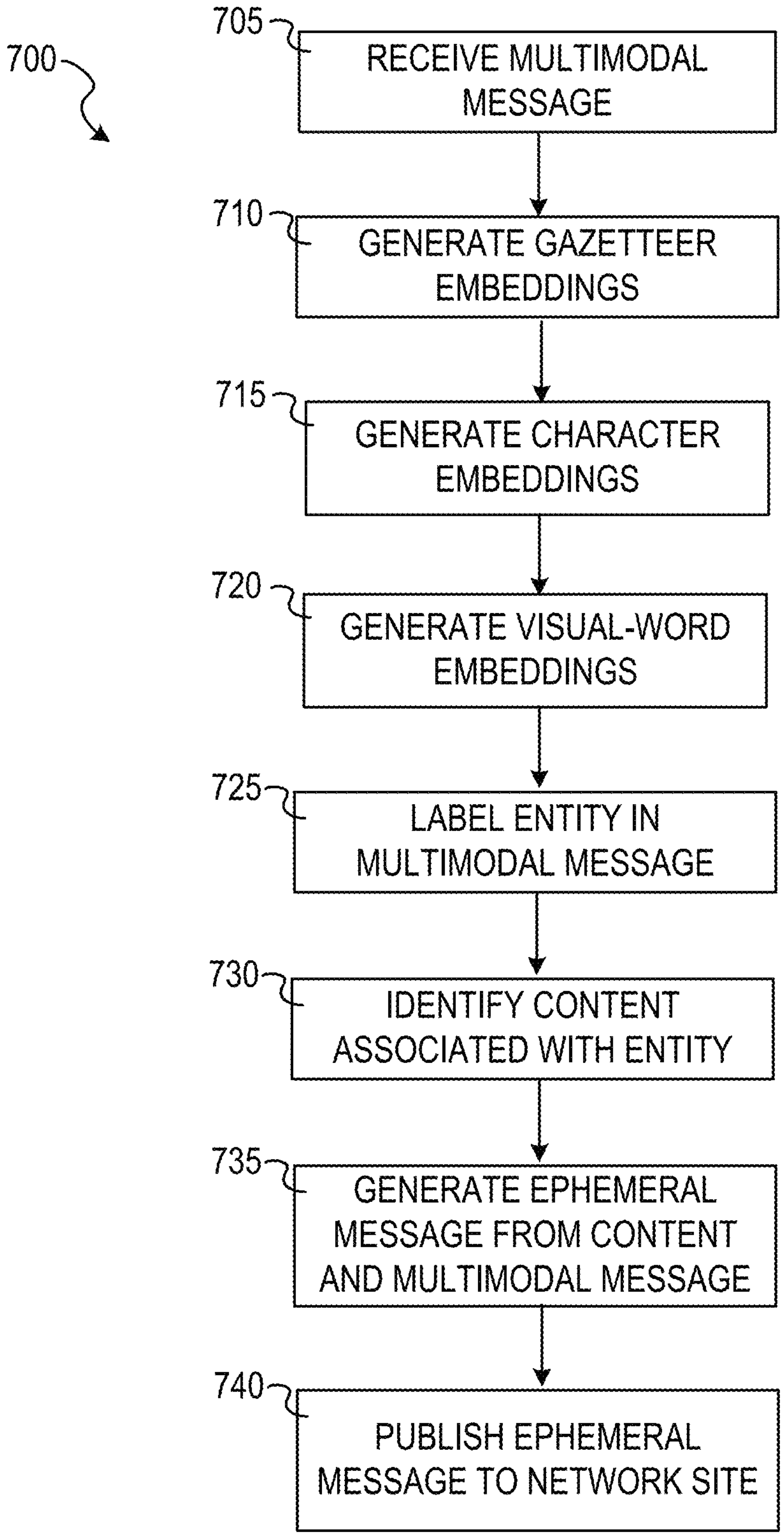
FIG. 7A shows a flow diagram of a method for identifying named entities in a caption of a multimodal message using visual attention based image data and gazetteer data, according to some example embodiments.

FIG. 7A shows a flow diagram of a method 700 for identifying named entities in a caption of a multimodal message using visual attention based image data and gazetteer data, according to some example embodiments. At operation 705, the interface engine 605 generates the multimodal message. For example, the interface engine 605 may use a camera of the client device 102 to capture video, and an audio sensor of the client device 102 to simultaneously capture voice data and may further receive a caption input by the user of the client device 102 for inclusion with the audio data and the video data in the multimodal message.

At operation 710, the gazetteer engine 625 analyzes each word in the caption of the multimodal message and generates a gazetteer vector for the words in the caption that correspond to gazetteer's (e.g. lists of celebrities, lists of cities, and so on). At operation 715, the character engine 620 generates character vectors from each character in the caption of the multimodal message. At operation 720, the visual word engine 630 generates a visual word vector from the image of the multimodal message and the caption of the multimodal message, as discussed in further detail below with reference to FIG. 12.

At operation 725, the classification engine 640 labels one or more words in the caption of the multimodal message as a named entity. At operation 730, the message engine 645 identifies content pre-associated with the identified entity. At operation 735, the message engine 645 generates an ephemeral message from the associated content and the multimodal message. For example, the message engine 645 may overlay the pre-associated content on the multimodal message to generate the ephemeral message. At operation 740, the message engine 645 publishes the ephemeral message on a network site, such as a social media website or a network service that provides the ephemeral message is to one or more client devices via the messaging client application 104.

Figure 7B:
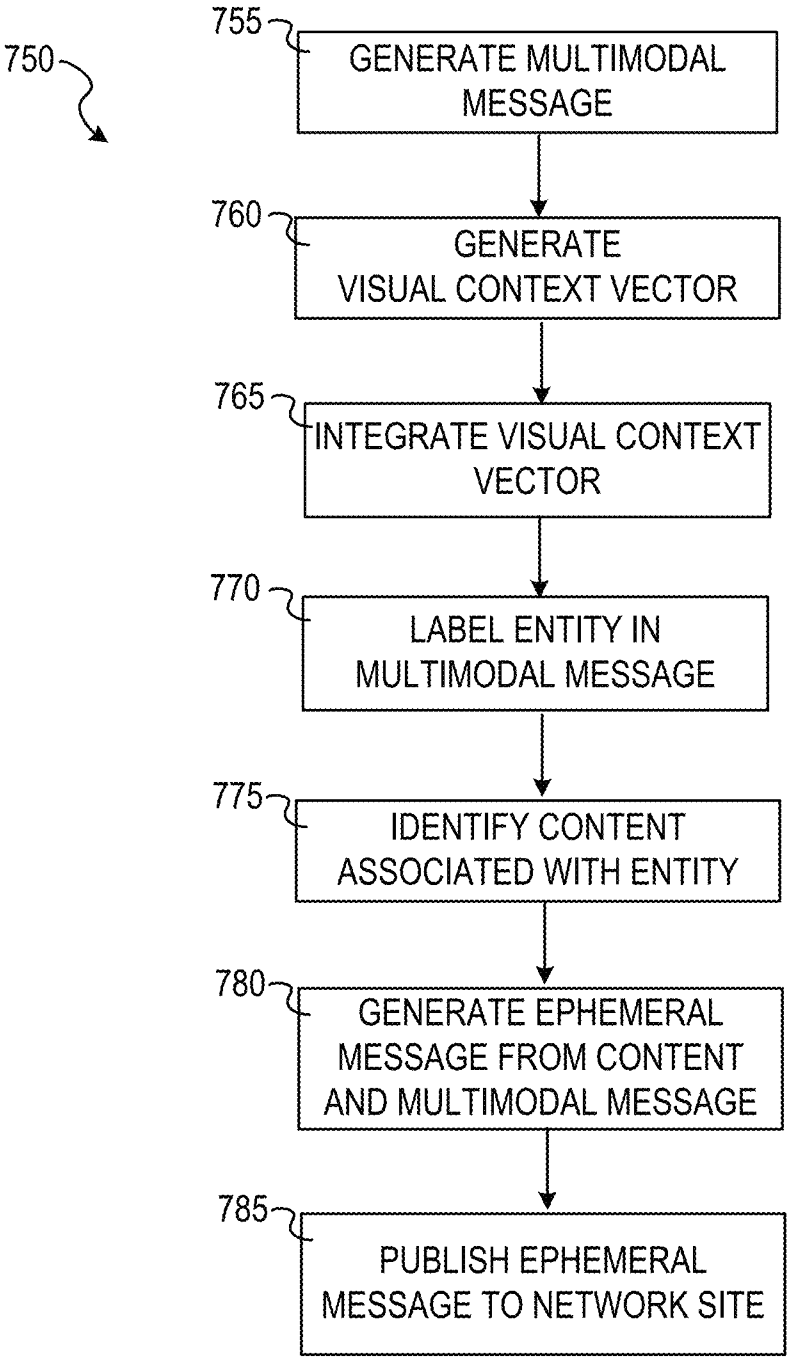
FIG. 7B shows a flow diagram of method of identifying named entities using a visual attention mechanism, according to some example embodiments.

FIG. 7B shows a flow diagram of a method 750 for identifying a named entity without gazetteer, according to some example embodiments. In the example of FIG. 7B, entities are named using the visual word engine 630 (e.g., architecture 1200 of FIG. 12) without the user of lists or gazetteers. At operation 755, the interface engine 605 generates the multimodal message. For example, the interface engine 605 may use a camera of the client device 102 to capture video, and an audio sensor of the client device 102 to simultaneously capture voice data and may further receive a caption input by the user of the client device 102 for inclusion with the audio data and the video data in the multimodal message.

At operation 760, the visual word engine 630 generates a visual context vector using the caption and the image. For example, the caption is encoded as a query using a LSTM, and visual representations (e.g., global and/or regional representation) are generated using a convolutional neural network. The query and the visual representations are input into an attention neural network which then generates the visual context vector (e.g., as discussed in further detail below with reference to FIG. 12).

At operation 760, the visual word engine 630 integrates the visual context vector into an entity recognition neural network. The entity recognition neural network comprises a bidirectional LSTM layer, a conditional random field layer, and, optionally, a modulated gate layer, according to some example embodiments. In some example embodiments, the visual context vector is used to seed or initialize a forward LSTM cell of the entity recognition neural network. In some example embodiments, the visual context vector is integrated at the word-level (e.g., for each word of the caption) using the modulated gate layer, as discussed in further detail below, with reference to FIG. 12.

At operation 770, the classification engine 640 labels one or more words in the caption of the multimodal message as a named entity. At operation 775, the message engine 645 identifies content pre-associated with the identified entity. As used here, pre-associated means after the neural network is trained but before the network model is distributed to client devices; that is, pre-associated means before run time by an end user of client device 102. At operation 780, the message engine 645 generates an ephemeral message from the associated content and the multimodal message. For example, the message engine 645 may overlay the pre-associated content on the multimodal message to generate the ephemeral message. At operation 785, the message engine 645 publishes the ephemeral message on a network site, such as a social media website or a network service that provides the ephemeral message is to one or more client devices via the messaging client application 104.

Although the operations of method 750 are discussed as separate steps, it is appreciated by those having ordinary skill in the art of neural networks that some of the operations (e.g., operations 760, 765, 770) are performed as one step by a neural network architecture (e.g., architecture 1200) which is trained via end-to-end training.

Figure 8:
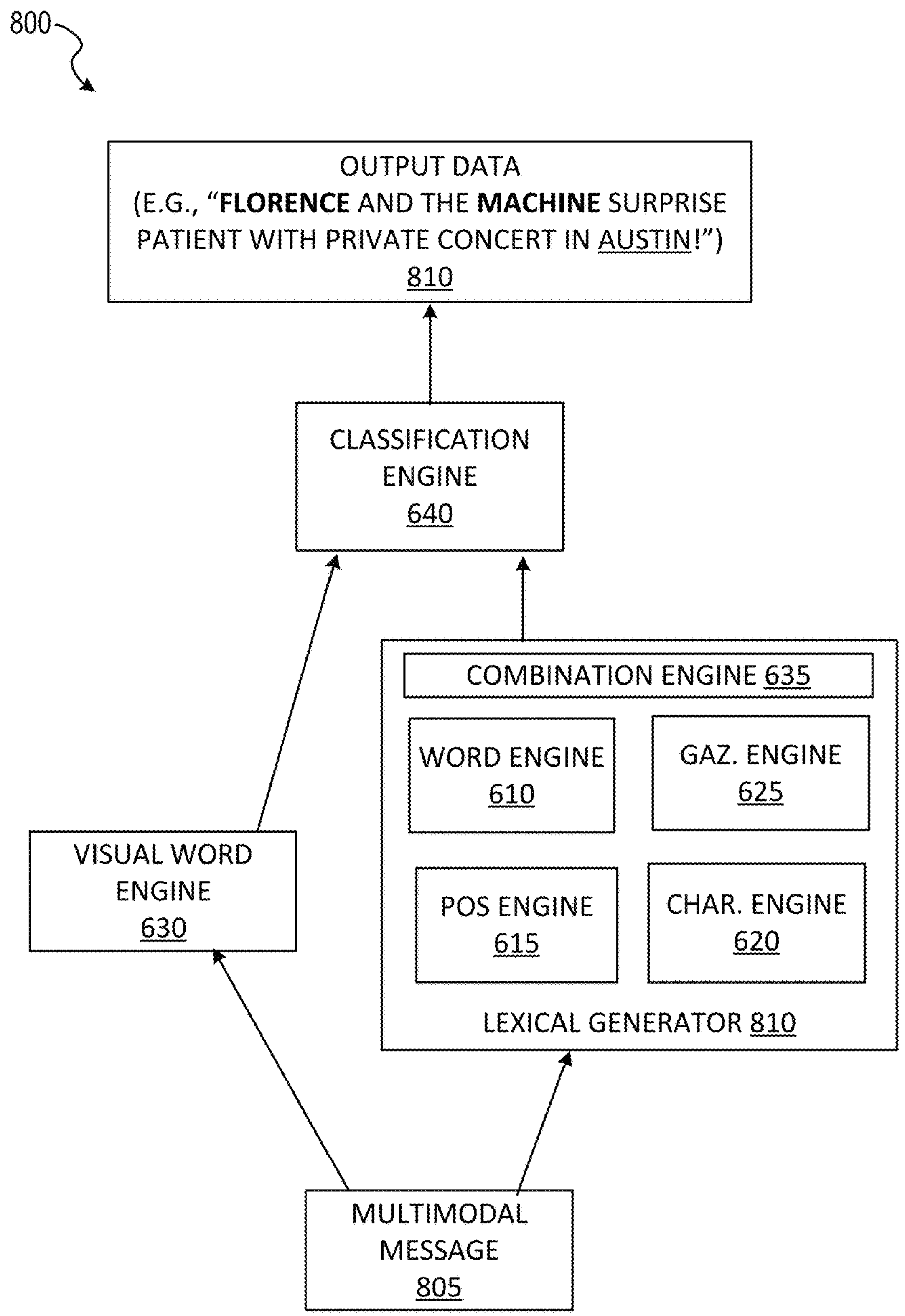
FIG. 8 shows an architecture for generating named entity recognition tags using visual attention word-based data and gazetteer vectors, according to some example embodiments.

FIG. 8 shows an architecture 800 for generating named entity recognition tags using visual attention word-based data and gazetteer vectors, according to some example embodiments. As illustrated, a multimodal message 805 is input into a lexical generator 810. The lexical generator, can comprise the word engine 610, the part-of-speech engine 615, the gazetteer engine 625, the character engine 620, and a combination engine 635. Details of how the lexical generator 810 connection outputs data between the engines is detailed in the following figures. At a high-level, the combination engine 635 combines vectors from the word engine 610, the part-of-speech engine 615, the gazetteer engine 625, and the character engine 620 to generate a combined vector which is input into the classification engine 640. The multimodal message 805 is further input into a visual word engine 630, which is configured to generate a word vector from the image and the caption of the multimodal message 805, as discussed in further detail below with reference to FIG. 12. The classification engine 640 receives the input data from the visual word engine 630 and the lexical generator 810 and recurrently generates (e.g. using a bidirectional LSTM neural network) tags indicating whether one or more of the words in the caption of the multimodal message is a named entity. For example, as illustrated, the classification engine 640 can generate output data 815. For example, if the multimodal message included the caption "Florence and the machine surprise patient with private concert in Austin!", the output data 815 may indicate that the term "Florence" is the beginning of a name and the term machine is the end of a name of an entity using a type of tag or metadata (as indicated by the bold font). Further the output data 815 may also indicate that the term Austin is likely the city of Austin, Texas and not a name for example using it further tag or metadata (as indicated by the underlined font).

Figure 9:
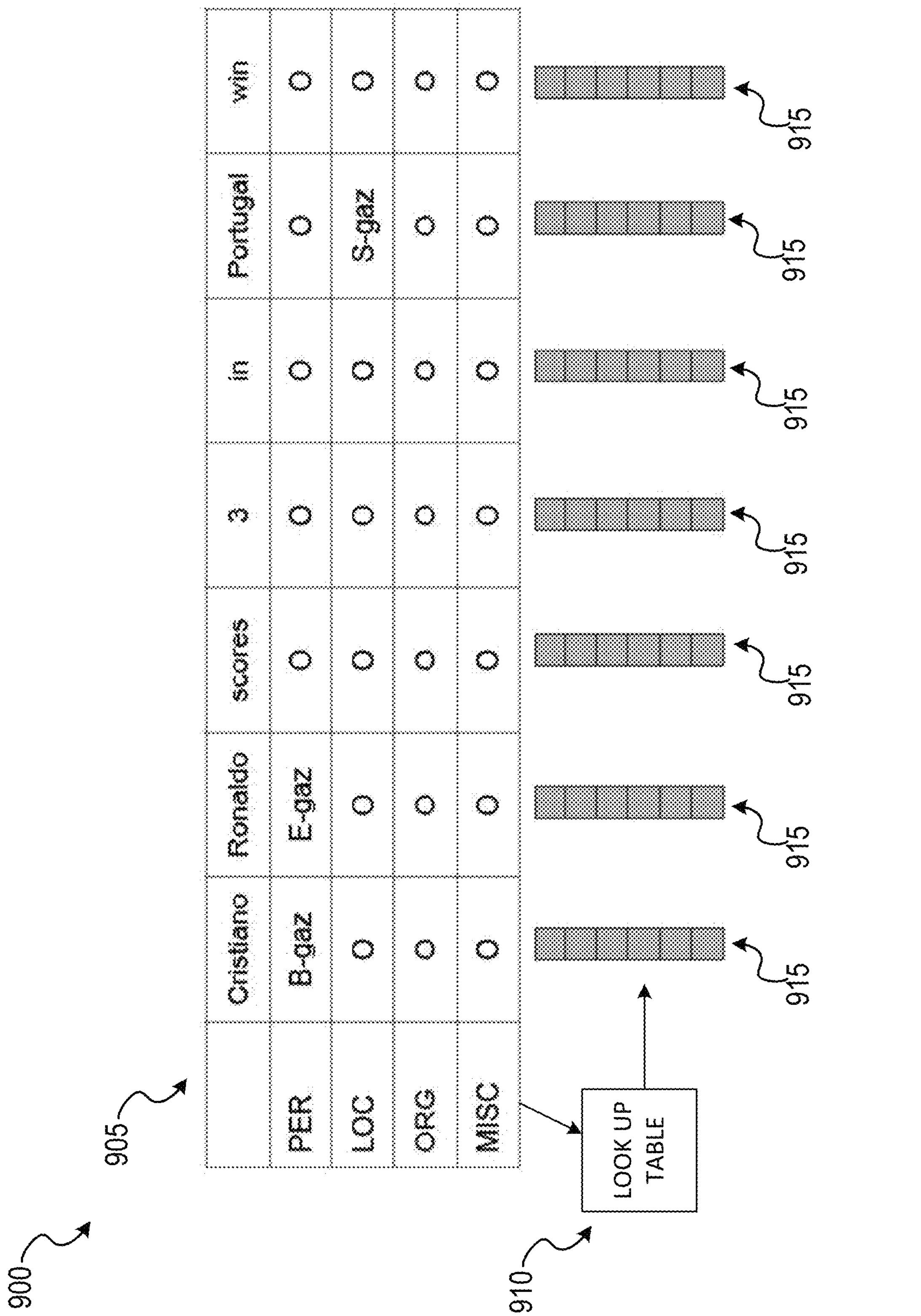
FIG. 9 shows an example architecture of the gazetteer engine, according to some example embodiments.

FIG. 9 shows an example architecture 900 of the gazetteer engine 625, according to some example embodiments. In FIG. 9, the caption in the multimodal message is "Cristiano Rinaldo scores 3 in Portugal win". The gazetteer engine 625 can generate a matrix 905 which tags each word of the caption as corresponding to a gazetteer of a plurality of gazetteers used to train the gazetteer engine 625. In particular, for example, the term Cristiano is labeled as a beginning tag of a gazetteer and Rinaldo is labeled as the ending tag of a gazetteer of a same entity. Portugal is further labeled as belonging to a location-based gazetteer. The gazetteer engine 625 consults a lookup table 910, which stores gazetteer vectors 915 for each of the possible gazetteers and associates each word in the caption with the is proper gazetteer vector if that term in the caption is to receive a gazetteer vector (e.g. the term in may be a null vector).

Figure 10:
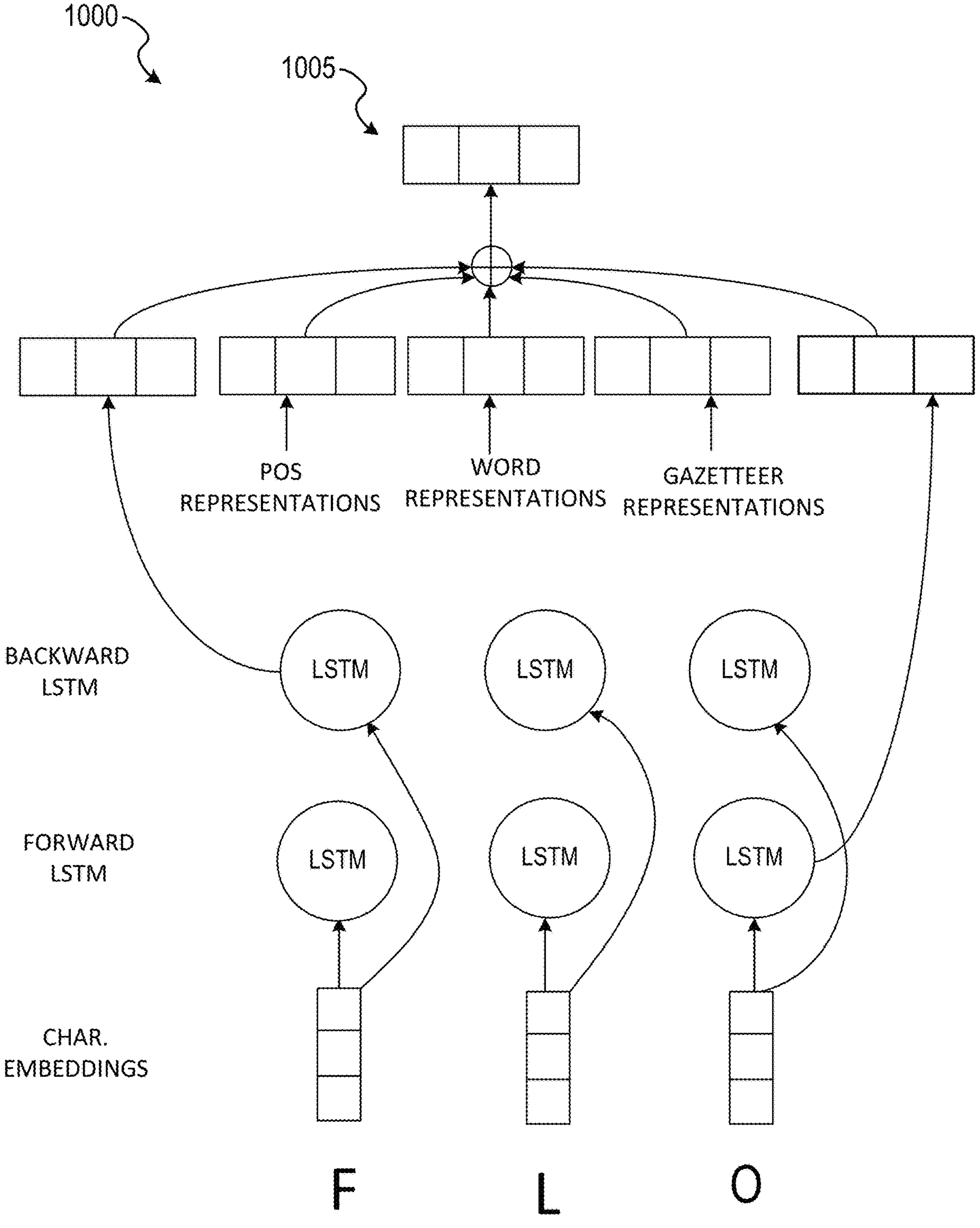
FIG. 10 shows an architecture for a lexical generator, according to some example embodiments.

FIG. 10 shows an architecture 1000 for the lexical generator 810, according to some example embodiments. As illustrated, each character of the caption can be input into the character engine 620 which incorporates a bidirectional LSTM. The combination engine 635 concatenates a character embedding in a forward time direction, a character embedding in a backward time direction, a part-of-speech representation for that word, a word embedding for that word, a gazetteer representation of vector for that word, to generate the combined vector 1005 which is input into the classification engine 640. The combined vector 1005 describes a single word of the caption, e.g., "Florence" from "Florence and the Machine".

Figure 11:
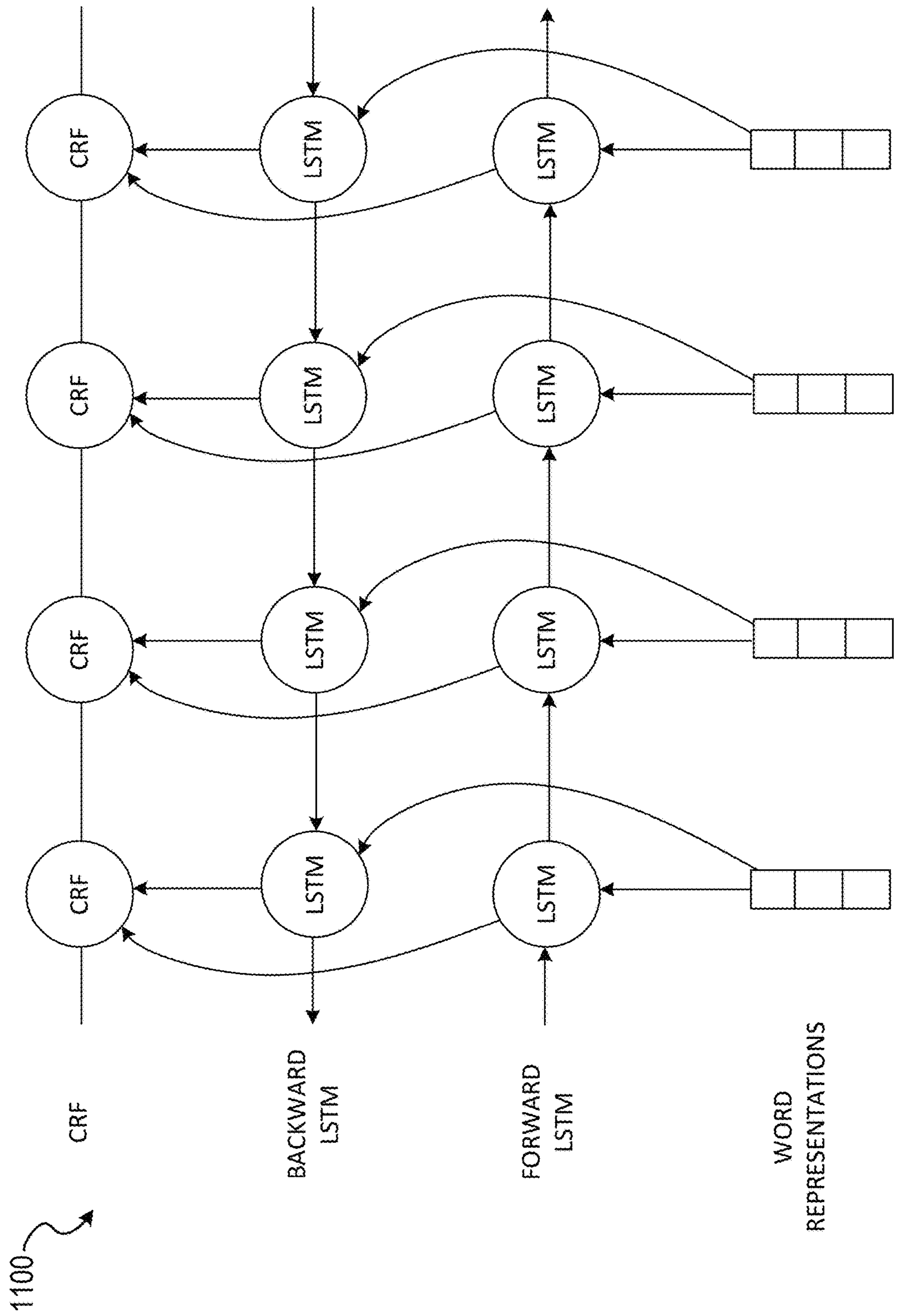
FIG. 11 shows an example architecture of the classification engine, according to some example embodiments.

FIG. 11 shows an example architecture 1100 of the classification engine 640, according to some example embodiments. As illustrated, word representations may be input into a bidirectional LSTM and a conditional random field (CRF), where each word in the caption is recursively labeled as belonging to a named entity. The word representations input into architecture 1100 may be the combined vectors (e.g. combined vector 1005 generated from the lexical generator) and may also include a word from the visual word engine 630.

Figure 12:
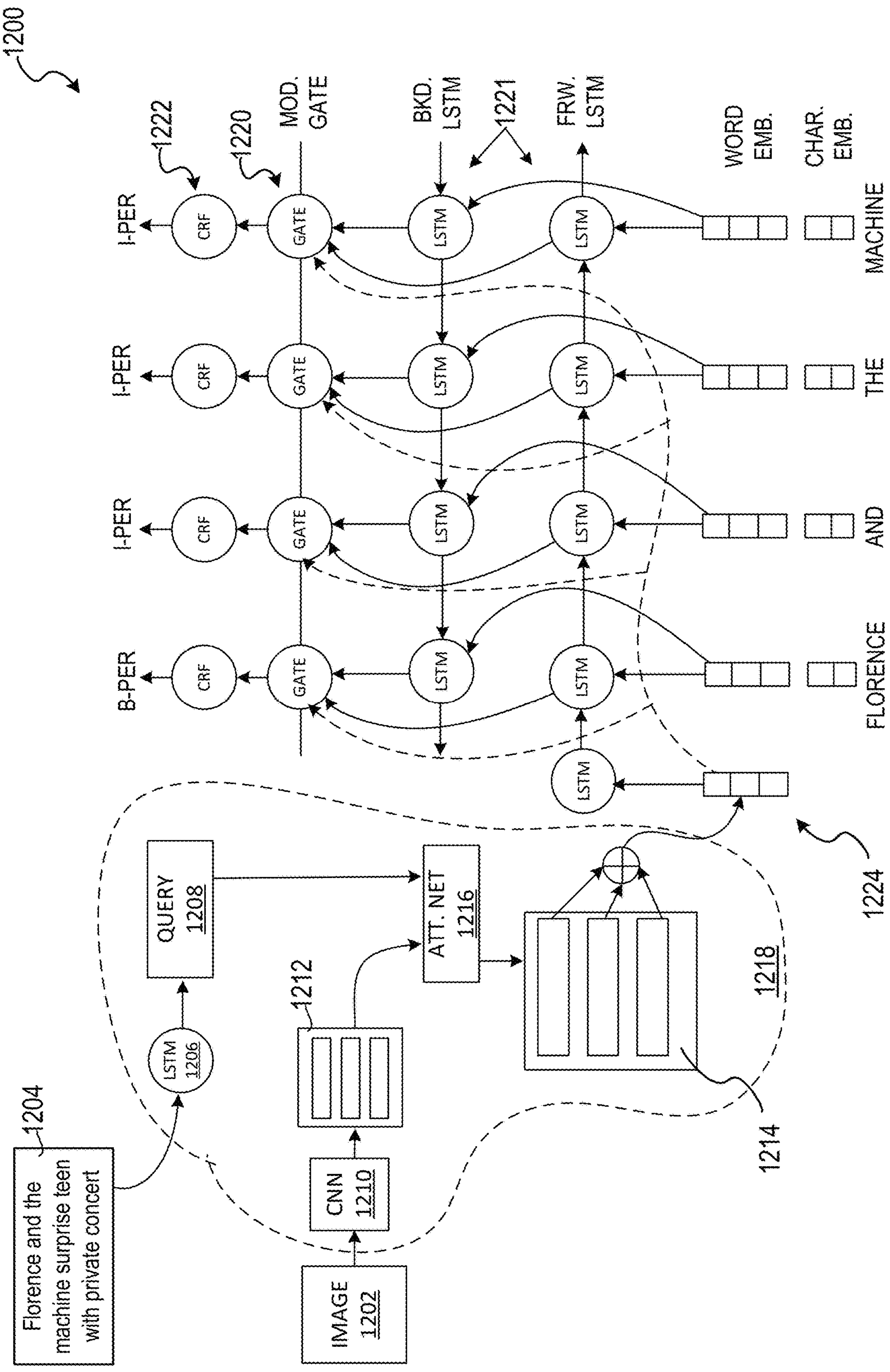
FIG. 12 shows an architecture for the visual word engine and the classification engine, according to some example embodiments.

FIG. 12 shows an example visual word engine 630 neural network architecture 1200, according to some example embodiments. The visual word engine 630 comprises three regions including a sequence labelling model (comprising bidirectional LSTM layer 1221 and CRF layer 1222), a visual attention model 1218, and visual modulation gate 1220 layer. At a high-level, given a pair of caption 1204 and image 1202 as input, the Visual Attention Model 1218 extracts regional visual features from the image and computes the weighted sum of the regional visual features as the visual context vector 1224, based on their relatedness with the sentence. The BLSTM-CRF sequence labeling model predicts the label for each word in the caption 1204 based on both the visual context vector 1224 and the textual information of the words. The modulation gate 1220 layer controls the combination of the visual context vector 1224 and the word representations for each word before the CRF layer 1222.

Sequence Labeling Model

The Sequence Labeling Model implements name tagging as a sequence labeling problem. Given a sequence of words: $S=\{s_1, s_2, \ldots, S_n\}$, the Sequence Labeling Model aims to predict a sequence of labels: $L=\{l_1, l_2, \ldots, l_n\}$, where $l_i \in L$ and L is a pre-defined label set. The Sequence Labeling Model comprises bidirectional LSTM layer 1221, which are variants of Recurrent Neural Networks (RNNs) designed to capture long-range dependencies of input. The equations of a LSTM cell are as follows:

$$i_t = \sigma(W_{xi}x_t + W_{hi}h_t - 1 + b_i)$$

$$f_t = \sigma(Wxfxt + Whfht - 1 + b_f)$$

$$\tilde{c}_t = \tanh(W_{xc}x_t + W_{hc}h_t - 1 + b_c)$$

$$c_t = f_t \odot c_t - 1 + i_t \odot \tilde{c}_t$$

$$o_t = \sigma(W_{xo}x_t + W_{ho}h_t - 1 + b_o)$$

-continued $$h_t = o_t \odot \tanh(c_t)$$

where $x_t$, $c_t$ and $h_t$ are the input, memory and hid-den state at time t respectively. $W_{xi}$, $W_{hi}$, $W_{xf}$, $W_{hf}$, $W_{xc}$, $W_{he}$, $W_{xo}$, and $W_{ho}$ are weight matrices. $\odot$ is the element-wise product function and $\sigma$ is the element-wise sigmoid function. Sequence Labeling Model implements a Bidirectional LSTM because the name tagging task benefits from both of the past (left) and the future (right) contexts. In particular, the right and left context representations are concatenated for each word: $h_t=[h_{right}, h_{left}]$.

The Sequence Labeling Model generates the character-level representation ("CHAR. EMB.") for each word using another BLSTM, which is included in architecture 1200 but omitted for clarity. The BLSTM receives character embeddings as input and generates representations combining implicit prefix, suffix and spelling information. The final word representation $x_i$ is the concatenation of word embedding $e_i$ and character-level representation $c_i$.

$$c_i=BLSTM_{char}(s_i)\ s_i \in S$$

$$x_i=[e_i, c_i]$$

Further, the Sequence Labeling Model comprises a CRF layer 1222 to consider constraint of the labels in the neighborhood. For example, an I-LOC must follow B-LOC, where LOC refers to the label being a location type and be is "Beginning" and "I" is intermediate". Thus, as illustrated in FIG. 12, Florence is a B-PER (where PER is for Person type), which is followed by three non-beginning type I-PER labels.

Visual Attention Model

The image 1202 is input into a convolutional neural network (e.g., Residual Network (ResNet) to generate visual vector 1212 comprising visual features for regional areas as well as for the entire image 1202:

$$V_g=\text{ResNet}_g(I)$$

$$V_r=\text{ResNet}_r(I)$$

where the global visual vector Vg, which represents the entire image 1202, is the output before the last fully connected layer. The last fully connected layer outputs the probabilities over 1000 classes, according to some example embodiments. The dimension of Vg is 1,024. $V_r$ are the visual representations for regional areas and they are extracted from the last convolutional layer of the CNN 1210 (e.g., last layer of ResNet). The dimension of $V_r$ is 1,024×7×7, where 7×7 is the number of regions in the image and 1,024 is dimension of the feature vector. Thus, each feature vector of Vr corresponds to a 32×32 pixel region of the rescaled input image.

The global visual vector is a reasonable representation of the whole input image 1202 but is improvable. In some cases, only parts of an image are related to the associated caption. The visual attention network is configured to address further improve the visual representation by focusing on regions of the input image that are more likely related or useful in context of the corresponding caption.

In some example embodiments, the attention network 1216 maps a query and a set of key-value pairs to an output 1214. The output 1214 is a weighted sum of the values and the assigned weight for each value is computed by a function of the query and corresponding key. In some example embodiments, the caption 1204 is encoded into a query 1208 (e.g., encoded text) via a LSTM 1206. In particular, the LSTM 1206 encodes the caption 1204 into encoded text, query 1208. The inputs into the LSTM 1206 are the concatenations of word embeddings and character-level word representations. Different from the LSTM model used for Sequence Labeling Model (e.g., "BKD. LSTM", "FRW. LSTM"), the LSTM 1206 aims to get the semantic information of the caption, and further it the LSTM 1206 is unidirectional:

$$Q=\text{LSTMquery}(S)$$

The attention network 1216 receives the query and the regional visual representations Vr as keys and values.

Attention Implementation: Based on experimental results, dot product implementations result in more concentrated attentions and linear projection after summation results in more dispersed attentions. In the context of name tagging, linear projection after summation is implemented because it is beneficial for the model to utilize as many related visual features as possible, and concentrated attentions may make the model bias. For implementation, the text query vector Q and regional visual features Vr are projected into the same dimensions:

$$P_t=\tan h(W_t Q)$$

$$P_v=\tan h(W_v V_r)$$

The projected query vector is then summed with each projected regional visual vector respectively:

$$A=P_t \oplus P_v$$

The weights of the regional visual vectors are:

$$E = softmax(W_a A + b_a)$$

where Wa is weights matrix. The weighted sum of the regional visual features is:

$$v_c = \sum \alpha_i v_i \quad \alpha_i \in E,\ v_i \in V_r$$

The architecture uses $v_c$ as the visual context vector 1224 to initialize the BLSTM Sequence Labeling Model discussed above.

Visual Modulation Gate

In some example embodiments, the visual context vector 1224 is used initialize the LSTM cell, as indicated by the visual context vector 1224 being input into the first cell of "FRW. LSTM". In some example embodiment, the visual context vector 1224 is not used to initialize the LSTL but incorporated at the word level. Generally, visual features contribute differently when they are used to infer the tags of different words. For example, the architecture 1200 can easily find matched visual patterns from associated images for verbs such as 'sing', 'run', and 'play'; and words/phrases such as names of basketball players, artists, and buildings are often well-aligned with objects in images. However, it is difficult to align function words such as 'the', 'of' and 'well' with visual features. Fortunately, most of the challenging cases in name tagging involve nouns and verbs, the disambiguation of which can benefit more from visual features. As such, according to some example embodiments, the visual context vector 1224 is incorporated at word level individually, as indicated by the dotted lines from visual context vector 1224 to respective instances of gates in the modulation gate 1220 layer.

The modulation gate 1220 dynamically controls the combination of visual features and word representation generated by BLSTM at word-level, before feeding them into the CRF layer 1222 for tag prediction. The equations for the implementation of modulation gate 1220 are as follows:

$$\beta_v = \sigma(W_v h_i + U_v v_c + b_v)$$

$$\beta_w = \sigma(W_w h_i + U_w v_c + b_w)$$

$$m = \tanh(W_m h_i + U_m v_c + b_m)$$

$$w_m = \beta_w \cdot h_i + \beta_v \cdot m$$

where $h_i$ is the word representation generated by BLSTM, $v_c$ is the computed visual context vector, $W_v$, $W_w$, $W_m$, $U_v$, $U_w$ and $U_m$ are weight matrices, $\sigma$ is the element-wise sigmoid function, and $w_m$ is the modulated word representations input into the CRF layer 1222.

Figure 13A:
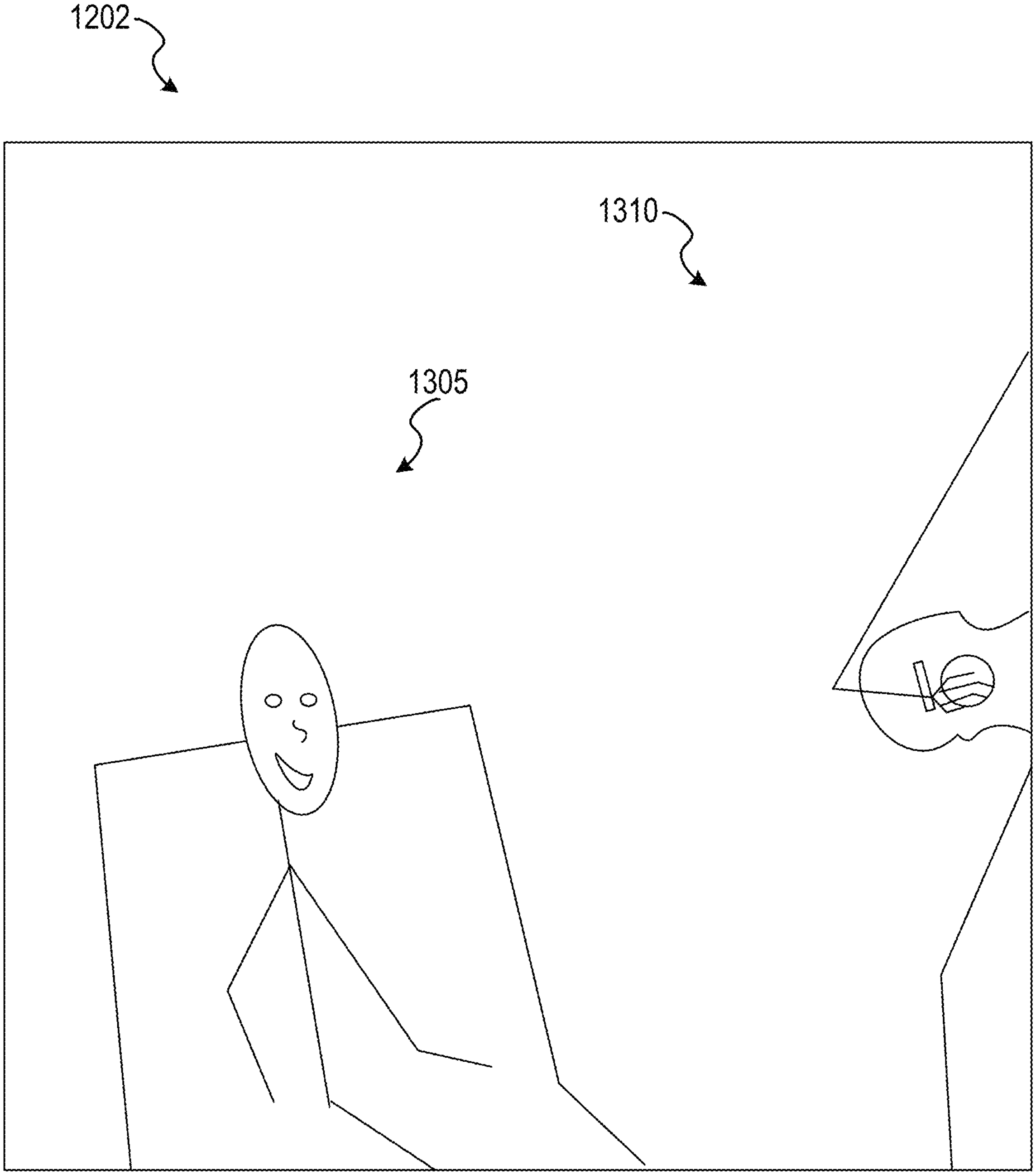
FIG. 13A shows an image of the multimodal message, according to some example embodiments.

FIG. 13A shows an image 1202 of the multimodal message, according to some example embodiments. The image 1202 depicts a patient 1305 on a hospital bed and a partially out-of-frame guitar player 1310. The corresponding caption 1204 (not depicted in FIG. 13A) is the sentence "Florence and the machine surprise teen with private concert". Conventionally, the caption 1204 can be difficult to parse because "Florence" could be the name of a person in the image, or refer to something else, such as one term of a band's full name.

Figure 13B:
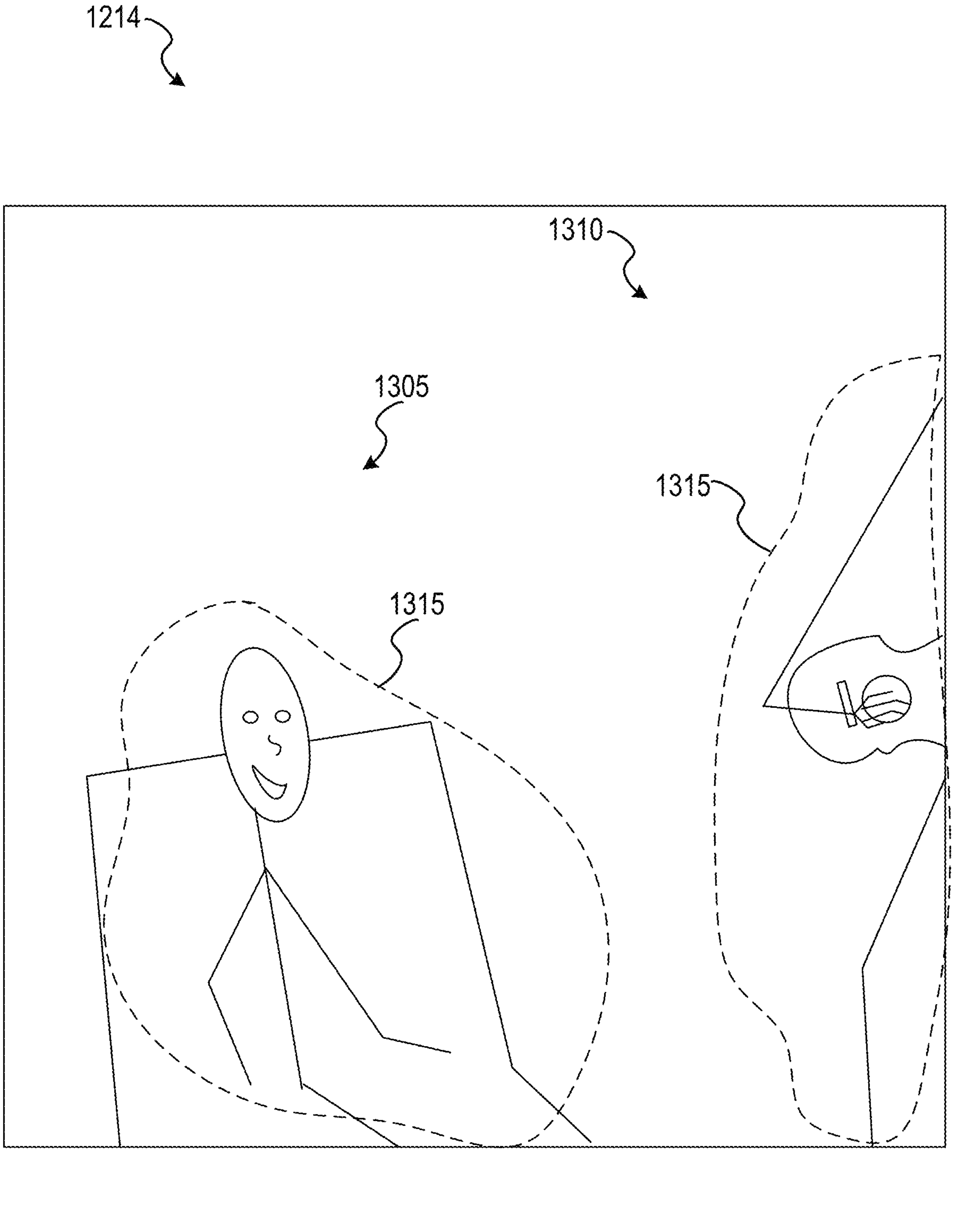
FIG. 13B shows an example image that corresponds to the image with certain areas being highlighted according to the caption.

FIG. 13B shows an example output of attention network 1216, according to some example embodiments. As illustrated, the attention network 1216 has relevant portions 1315 of the image 1202, thereby minimizing areas not related to the context of the caption. In particular, by using the regional image data (e.g., $V_r$, a portion of which depicts a guitar) and the caption 1204, the entity "Florence and the Machine" is identified as a named entity being discussed in the multimodal message.

Figure 14A:
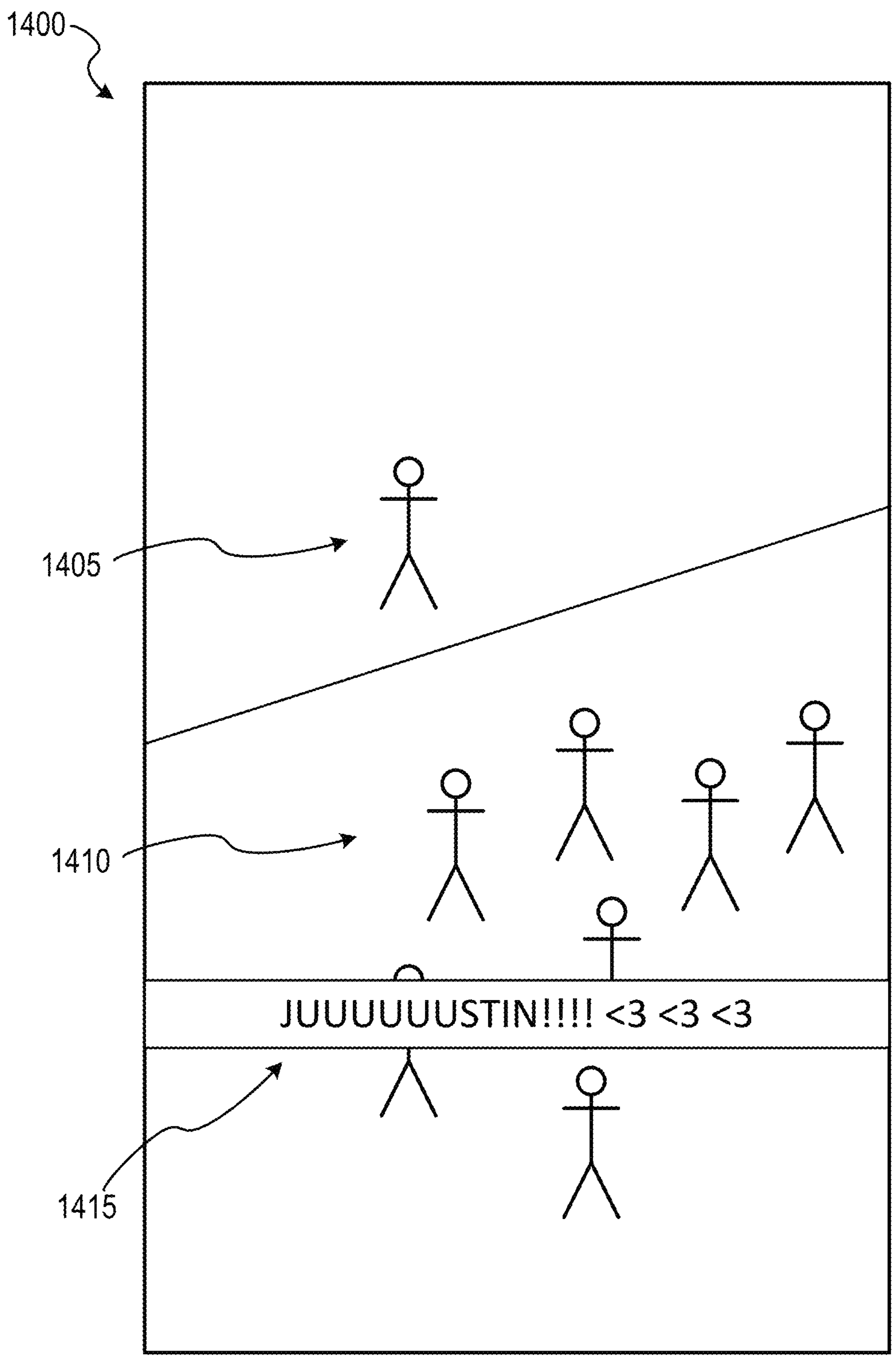
FIG. 14A shows an example multimodal message, according to some example embodiments.
Figure 14B:
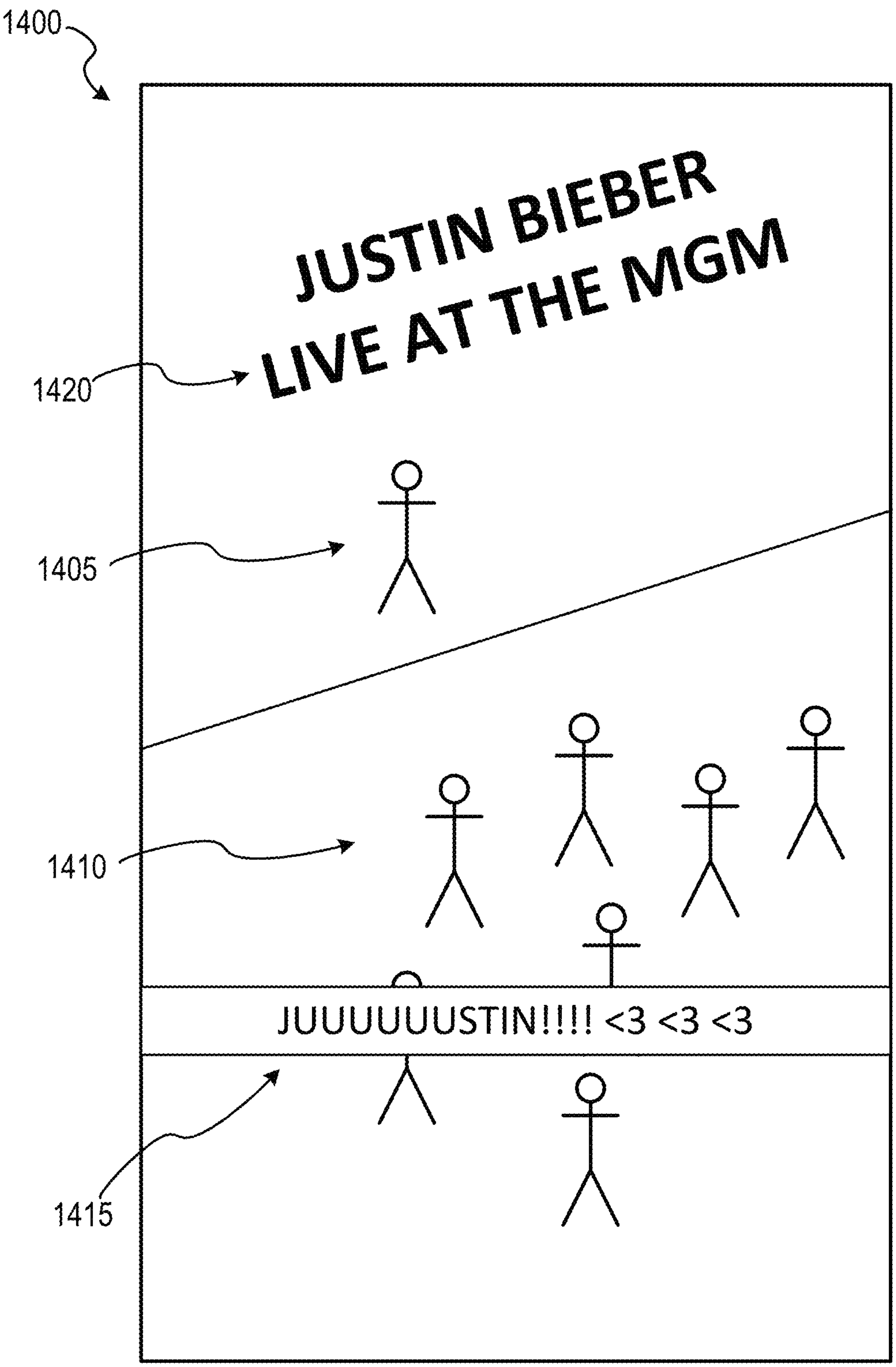
FIG. 14B shows example overlay content that has been identified using named entity recognition, according to some example embodiments.

FIG. 14A shows an example multimodal message 1400, according to some example embodiments. As illustrated, the multimodal message 1400 includes an image of a person on stage 1405 in front of an audience 1410, and a caption 1415 ("JUUUUUUSTIN!!!! <3 <3 <3" comprising an intentional misspelling of "Justin" and three pictorial heart symbols: "<3") that has been input by a user of the client device 102. Multimodal message 1400 exam is an example of the multimodal message received or otherwise generated at operation 705 of FIG. 7A. FIG. 14B shows example overlay content 1420 that has been identified by performing the method 700 of FIG. 7A, according to some example embodiments. In particular, for example, the visual named entity recognition system 210 has determined that the caption includes a reference to a named entity, that of the famous singer Justin Bieber. Accordingly, the overlay content 1420 that has been pre-associated with that named entity is retrieved from database 126 and overlaid on the multimodal message 1400 to be stored or otherwise published to a network site as an ephemeral message.

Figure 15:
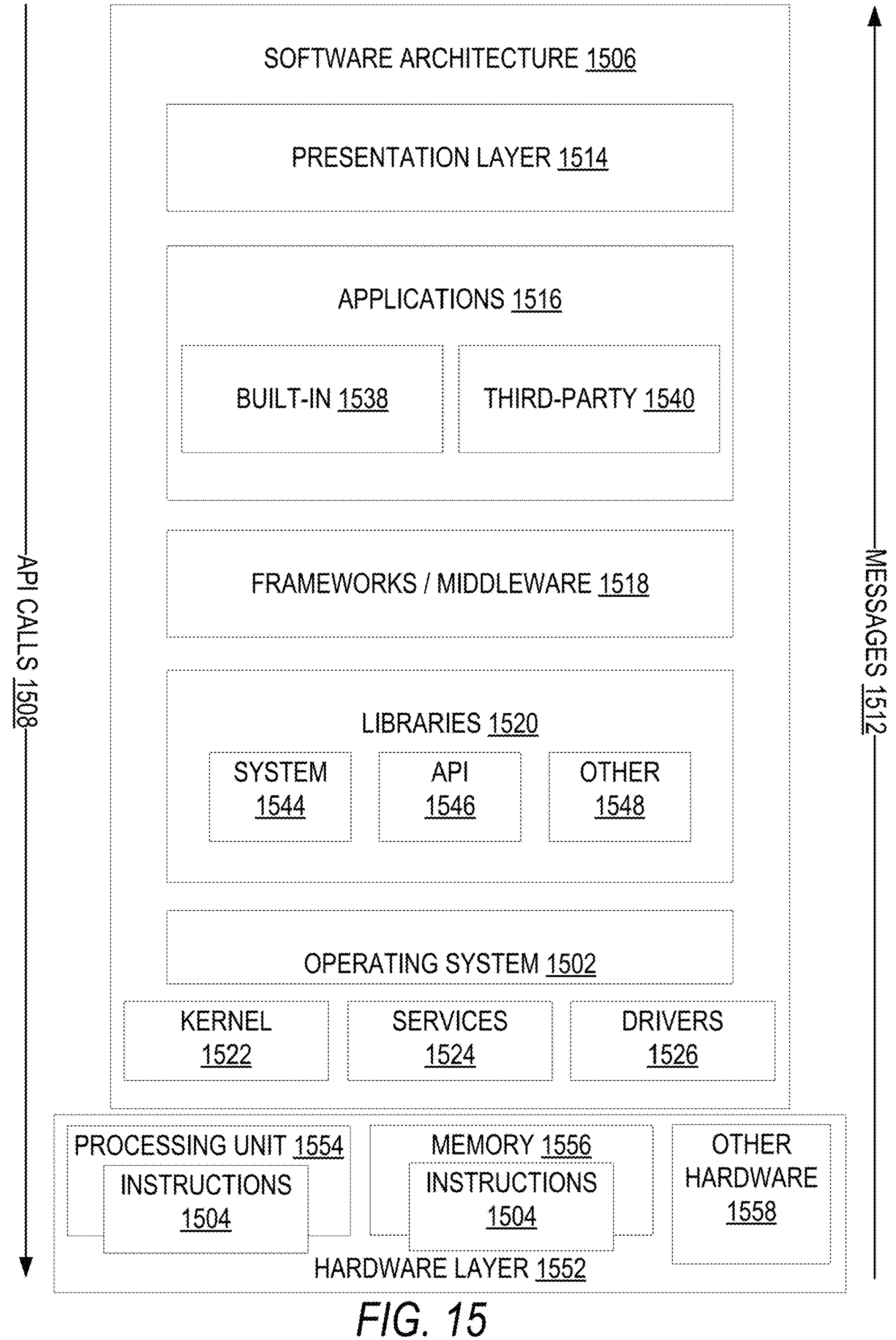
FIG. 15 is a block diagram illustrating a representative software architecture, which may be used in conjunction with various hardware architectures herein described.

FIG. 15 is a block diagram illustrating an example software architecture 1506, which may be used in conjunction with various hardware architectures herein described. FIG. 15 is a non-limiting example of a software architecture, and it will be appreciated that many other architectures may be implemented to facilitate the functionality described herein. The software architecture 1506 may execute on hardware such as a machine 1150 of FIG. 11 that includes, among other things, processors, memory, and input/output (I/O) components. A representative hardware layer 1552 is illustrated and can represent, for example, the machine 1150 of FIG. 11. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes a memory/storage 1556, which also has the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1511. Operationally, the applications 1516 and/or other components within the layers may invoke API calls 1508 through the software stack and receive a response in the form of messages 1512. The layers illustrated are representative in nature and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphical content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1516 may use built-in operating system functions (e.g., kernel 1522, services 1524, and/or drivers 1526), libraries 1520, and frameworks/middleware 1518 to create user interfaces to interact with users of the system. Alternatively, or additionally, in some systems, interactions with a user may occur through a presentation layer, such as the presentation layer 1511. In these systems, the application/component "logic" can be separated from the aspects of the application/component that interact with a user.

Figure 16:
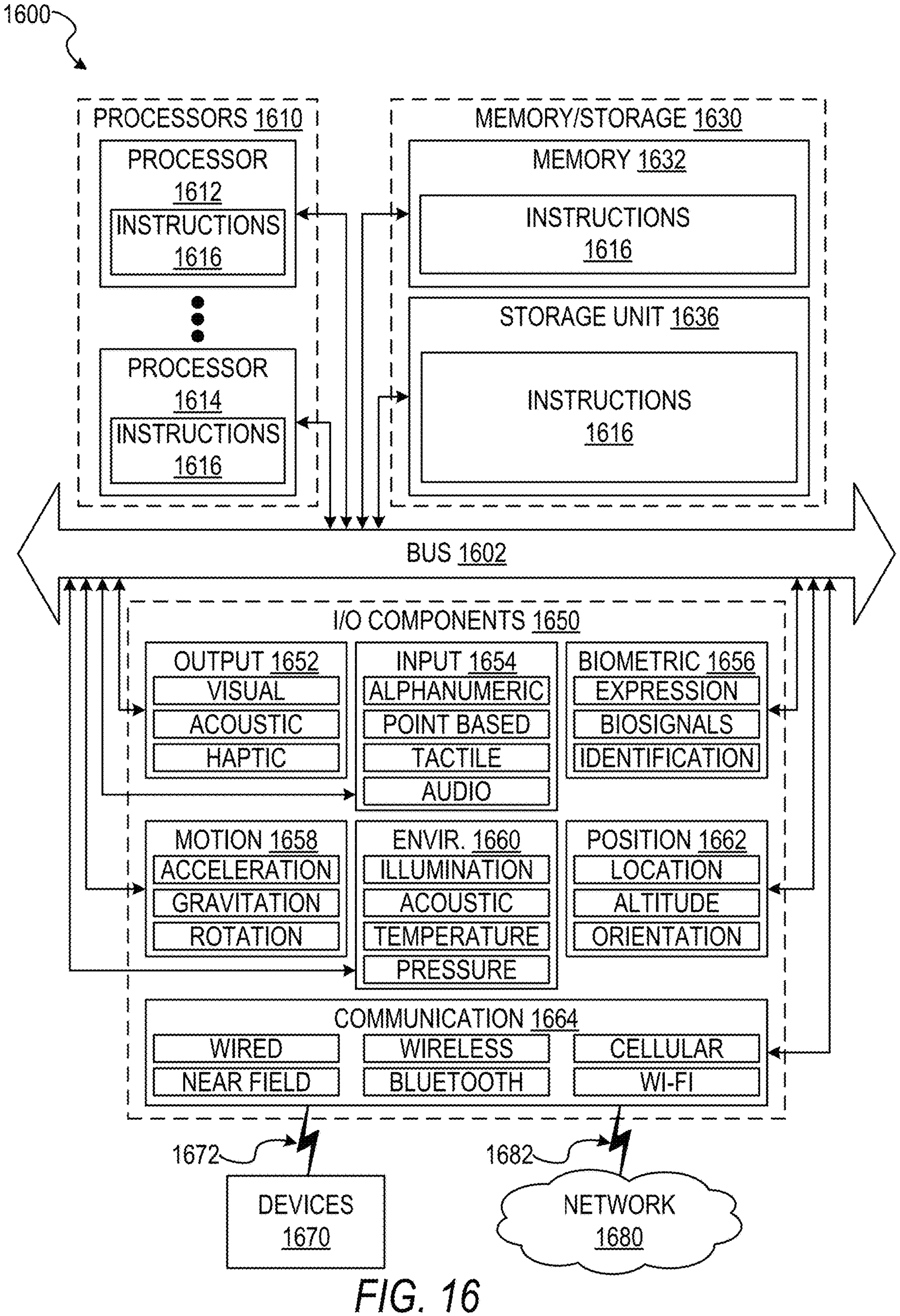
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor cache memory accessible to processor units 1612 or 1614), or any suitable combination thereof, during execution thereof by the machine 1600. Accordingly, the memory 1632, the storage unit 1636, and the memory of the processors 1610 are examples of machine-readable media.

The I/O components 1650 may include a wide variety of components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environment components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or other suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1616 for execution by the machine 1600, and includes digital or analog communications signals or other intangible media to facilitate communication of such instructions 1616. Instructions 1616 may be transmitted or received over the network 1680 using a transmission medium via a network interface device and using any one of a number of well-known transfer protocols.

"CLIENT DEVICE" in this context refers to any machine 1600 that interfaces to a communications network 1680 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1680.

"COMMUNICATIONS NETWORK" in this context refers to one or more portions of a network 1680 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1680 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions 1616 (e.g., code) for execution by a machine 1600, such that the instructions 1616, when executed by one or more processors 1610 of the machine 1600, cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1612 or a group of processors 1610) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1600) uniquely tailored to perform the configured functions and are no longer general-purpose processors 1610. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described here in.

Considering embodiments in which hardware components are temporarily configured (e.g., programmed), each of the hardware components need not be configured or instantiated at any one instance in time. For example, where a hardware component comprises a general-purpose processor 1612 configured by software to become a special-purpose processor, the general-purpose processor 1612 may be configured as respectively different special-purpose processors (e.g., comprising different hardware components) at different times. Software accordingly configures a particular processor 1612 or processors 1610, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1610 that are temporarily configured (e.g., by software) or permanently configured to perform the relevant operations. Whether temporarily or permanently configured, such processors 1610 may constitute processor-implemented components that operate to perform one or more operations or functions described herein. As used herein, "processor-implemented component" refers to a hardware component implemented using one or more processors 1610. Similarly, the methods described herein may be at least partially processor-implemented, with a particular processor 1612 or processors 1610 being an example of hardware. For example, at least some of the operations of a method may be performed by one or more processors 1610 or processor-implemented components. Moreover, the one or more processors 1610 may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network 1680 (e.g., the Internet) and via one or more appropriate interfaces (e.g., an API). The performance of certain of the operations may be distributed among the processors 1610, not only residing within a single machine 1600, but deployed across a number of machines 1600. In some example embodiments, the processors 1610 or processor-implemented components may be located in a single geographic location (e.g., within a home environment, an office environment, or a server farm). In other example embodiments, the processors 1610 or processor-implemented components may be distributed across a number of geographic locations.

"PROCESSOR" in this context refers to any circuit or virtual circuit (a physical circuit emulated by logic executing on an actual processor 1612) that manipulates data values according to control signals (e.g., "commands," "op codes," "machine code," etc.) and which produces corresponding output signals that are applied to operate a machine 1600. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1610 may further be a multi-core processor 1610 having two or more independent processors 1612, 1614 (sometimes referred to as "cores") that may execute instructions 1616 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:

identifying, using one or more processors of a machine, a multimodal message that includes an image and a caption comprising words;

generating, using an attention neural network, a visual context vector from the caption and the image, the visual context vector emphasizing portions of the caption based on objects depicted in the image;

generating, using an entity recognition neural network that comprises a bi-directional neural network, an indication that one or more words of the caption correspond to a named entity; and storing the one or more words as the named entity of the multimodal message.

2. The method of claim 1, further comprising:

initializing the entity recognition neural network using the visual context vector as an initial data input item.

3. The method of claim 1, further comprising:

selecting one or more items of content using the named entity; and generating a modified multimodal message comprising the image, the caption, and the one or more items of content.

4. The method of claim 1, wherein the attention neural network comprises a convolutional neural network, and the method further comprises:

generating, using the convolutional neural network, one or more image vectors from the image, wherein the attention neural network generates the visual context vector using the one or more image vectors and the caption.

5. The method of claim 4, wherein the one or more image vectors comprise a global vector corresponding to the image and regional vectors corresponding to regions of the image.

6. The method of claim 1, wherein the words of the caption comprise at least one or more of: individual characters, symbols, a sequence of characters.

7. The method of claim 1, wherein the entity recognition neural network comprises a conditional random field layer.

8. The method of claim 1, further comprising:

generating encoded text from the caption using a recurrent neural network, wherein the attention neural network generates the visual context vector at least in part from the encoded text.

9. The method of claim 1, further comprising:

integrating, using a modulation layer, the visual context vector into the entity recognition neural network for each word in the caption.

10. The method of claim 1, wherein the entity recognition neural network and the attention neural network are trained end-to-end.

11. A system comprising:

one or more processors of a machine; and a memory storing instructions that, when executed by the one or more processors, cause the machine to perform operations comprising:

identifying, using the one or more processors of the machine, a multimodal message that includes an image and a caption comprising words;

generating, using an attention neural network, a visual context vector from the caption and the image, the visual context vector emphasizing portions of the caption based on objects depicted in the image;

generating, using an entity recognition neural network that comprises a bi-directional neural network, an indication that one or more words of the caption correspond to a named entity; and storing the one or more words as the named entity of the multimodal message.

12. The system of claim 11, wherein the operations further comprise:

initializing the entity recognition neural network using the visual context vector as an initial data input item.

13. The system of claim 11, wherein the operations further comprise:

selecting one or more items of content using the named entity; and generating a modified multimodal message comprising the image, the caption, and the one or more items of content.

14. The system of claim 11, wherein the attention neural network comprises a convolutional neural network, and the operations further comprise:

generating, using the convolutional neural network, one or more image vectors from the image, wherein the attention neural network generates the visual context vector using the one or more image vectors and the caption.

15. The system of claim 14, wherein the one or more image vectors comprise a global vector corresponding to the image and regional vectors corresponding to regions of the image.

16. The system of claim 11, wherein the words of the caption comprise at least one or more of: individual characters, symbols, a sequence of characters.

17. The system of claim 11, wherein the entity recognition neural network comprises a conditional random field layer.

18. The system of claim 11, wherein the operations further comprise:

generating encoded text from the caption using a recurrent neural network, wherein the attention neural network generates the visual context vector at least in part from the encoded text.

19. The system of claim 11, wherein the operations further comprise:

integrating, using a modulation layer, the visual context vector into the entity recognition neural network for each word in the caption.

20. A machine-readable storage device embodying instructions that, when executed by a machine, cause the machine to perform operations comprising:

identifying, using one or more processors of the machine, a multimodal message that includes an image and a caption comprising words;

generating, using an attention neural network, a visual context vector from the caption and the image, the visual context vector emphasizing portions of the caption based on objects depicted in the image;

generating, using an entity recognition neural network that comprises a bi-directional neural network, an indication that one or more words of the caption correspond to a named entity; and storing the one or more words as the named entity of the multimodal message.

* * * * *